FREQUENCY SELECTIVE CIRCUITS FOR CURRENCY DETECTORS

Original Filed Oct. 27, 1959 10 Sheets-Sheet 1

INVENTORS
THEODORE H. SMITH
SIGMUND KRAMER
DONALD M. DANKO
BY Rey Eilers ATTY.

INVENTORS
THEODORE H. SMITH
SIGMUND KRAMER
DONALD M. DANKO
BY Roy Eilers ATTY.

FREQUENCY SELECTIVE CIRCUITS FOR CURRENCY DETECTORS

Original Filed Oct. 27, 1959 10 Sheets-Sheet 3

INVENTORS
THEODORE H. SMITH
SIGMUND KRAMER
DONALD M. DANKO
BY Roy Eilers ATTY.

FREQUENCY SELECTIVE CIRCUITS FOR CURRENCY DETECTORS

INVENTORS
THEODORE H. SMITH
SIGMUND KRAMER
DONALD M. DANKO
BY Roy Eilers ATTY.

FREQUENCY SELECTIVE CIRCUITS FOR CURRENCY DETECTORS

Original Filed Oct. 27, 1959

INVENTORS
THEODORE H. SMITH
SIGMUND KRAMER
DONALD M. DANKO
BY Roy Eilers ATTY.

May 24, 1966 T. H. SMITH ETAL 3,253,224

FREQUENCY SELECTIVE CIRCUITS FOR CURRENCY DETECTORS

Original Filed Oct. 27, 1959 10 Sheets-Sheet 6

INVENTORS
THEODORE H. SMITH
SIGMUND KRAMER
DONALD M. DANKO

BY Roy Eilers ATTY.

FREQUENCY SELECTIVE CIRCUITS FOR CURRENCY DETECTORS

Original Filed Oct. 27, 1959 10 Sheets-Sheet 7

INVENTORS
THEODORE H. SMITH
SIGMUND KRAMER
DONALD M. DANKO
BY Rey Eilers ATTY.

FREQUENCY SELECTIVE CIRCUITS FOR CURRENCY DETECTORS

Original Filed Oct. 27, 1959

INVENTORS
THEODORE H. SMITH
SIGMUND KRAMER
DONALD M. DANKO
BY Roy Eilers ATTY.

FREQUENCY SELECTIVE CIRCUITS FOR CURRENCY DETECTORS

Original Filed Oct. 27, 1959 10 Sheets-Sheet 9

INVENTORS
THEODORE H. SMITH
SIGMUND KRAMER
DONALD M. DANKO
BY Roy Eilers ATTY.

FREQUENCY SELECTIVE CIRCUITS FOR CURRENCY DETECTORS

Original Filed Oct. 27, 1959 10 Sheets-Sheet 10

INVENTOR.
THEODORE H. SMITH
SIGMUND KRAMER
DONALD M. DANKO
BY Roy Eilers ATT'Y.

United States Patent Office 3,253,224

Patented May 24, 1966

3,253,224

FREQUENCY SELECTIVE CIRCUITS FOR CURRENCY DETECTORS

Theodore H. Smith, Bay Village, Ohio, Sigmund Kramer, Orlando, Fla., and Donald Michael Danko, Parma, Ohio, assignors to National Rejectors, Inc., St. Louis, Mo., a corporation of Missouri Original application Oct. 27, 1959, Ser. No. 849,066. Divided and this application May 31, 1962, Ser. No. 199,177

5 Claims. (Cl. 328—1)

Figure 1:
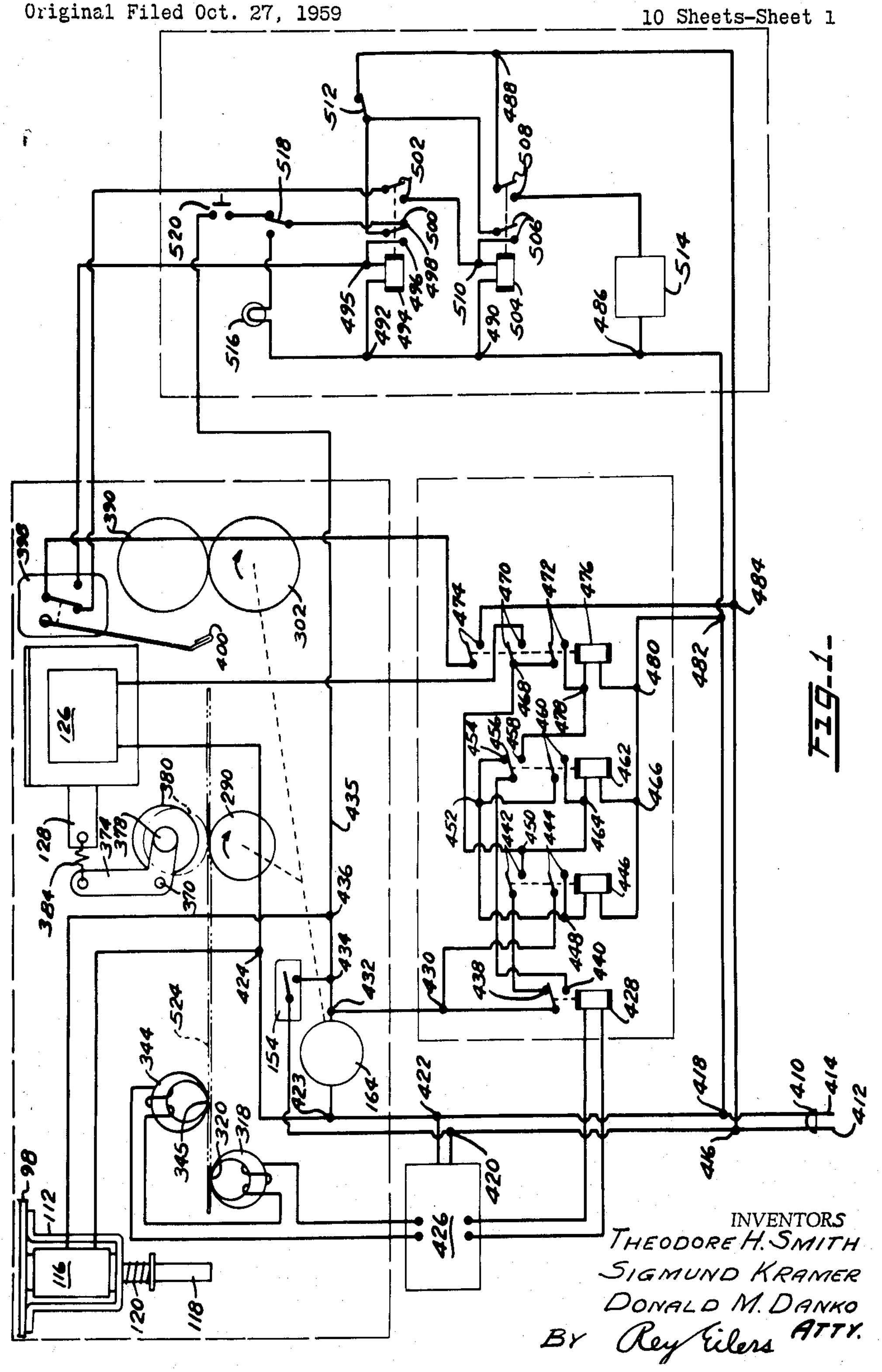

This is a division of co-pending application Serial No. 849,066 for Currency Detectors which was filed on October 27, 1959, by Theodore H. Smith, Sigmund Kramer and Donald M. Danko and now abandoned.

This invention relates to improvements in frequency selective circuits for currency detectors. It is therefore an object of the present invention to provide an improved frequency selective circuit for a currency detector for identifying authentic paper currency.

Each different demoniation of paper currency of the United States of America has a distinctive portrait thereon, and each of those portraits is set off against a background of darker tone. Those backgrounds are actually grids formed from fine, black vertical and horizontal lines; and those lines are usually formed from ink having magnetic properties. The vertical and horizontal lines of those grids are spaced apart predetermined distances; and therefore when relative movement between a bill and a magnetic head is effected at a predetermined rate, in a direction perpendicular to the vertical lines or to the horizontal lines, the voltage of the coil or coils of the magnetic head will vary at a predetermined rate. The grid lines have predetermined widths; and those widths coact with the relative movement at the predetermined rate to predetermine the durations of the voltage variations. The voltage variations thus vary at a predetermined rate, and they have predetermined durations; and those voltage variations will be introduced into a tuned amplifier which can respond to those voltage variations to cause the bill to be accepted. Such an arrangement is very desirable because it provides a direct and immediate testing of a bill and obviates all need of a negative, of a record, or of some other simulation of portions of a standard bill. Further such an arrangement obviates all of the problems, costs, and uncertainties inherent in trying to align and register an inserted bill with a negative, a record or some other simulation of portions of a standard bill. It is therefore an object of the present invention to provide relative movement between the grid lines in the portrait background of a bill and a magnetic head to obtain voltage variations in the coil or coils of said head and to use those voltage variations to cause that bill to be accepted.

The magnetic properties of the ink used in engraving the grid lines in the portrait backgrounds of currency of the United States of America are quite limited; and, consequently, the voltage variations that are obtainable by the magnetic sensing of those grid lines necessarily have low signal-to-noise ratios. This means that thermionic emission, transients and other noise can produce voltage variations that can simulate the voltage variations generated by relative movement between the grid lines, in the portrait background of a bill, and the air gap of a magnetic head. Because the magnetic properties of the ink used in engraving the portrait backgrounds of currency of the United States of America are wholly and completely beyond the control of manufacturers of currency detectors, there are positive limits to the signal-to-noise ratios of the voltage variations generated by the grid lines in the portrait backgrounds of bills. As a result, the problem of discriminating between voltage variations due to the grid lines and voltage variations due to noise is critical. For example, it would be impractical to base the acceptance or rejection of an inserted bill on the mere counting of a predetermined number of voltage variations as the portrait background of that bill moved past the air gap of the magnetic head, because a sizable and unpredictable proportion of those voltage variations could be due to noise rather than to grid lines. Further, it would not be satisfactory to base the acceptance or rejection of an inserted bill on the repetition rates of the leading and trailing edges of the grid lines because voltage variations due to noise could occasionally have those repetition rates. To be truly satisfactory, the acceptance or rejection of an inserted bill should be based upon the phase and the duration, as well as the repetition rate, of the voltage variations experienced as the portrait background of a bill is moved past the air gap of a magnetic head. The present invention bases the acceptance or rejection of an inserted bill upon the phase and duration and the repetition rate of the voltage variations experienced as the portrait background of a bill is moved past the air gap of a magnetic head; and, in doing so, that invention provides reliable identification of authentic currency and reliable rejection of spurious currency.

The present invention provides bill transports that hold the inserted bill immediately adjacent the magnetic head throughout the time the portrait and the background for the portrait are in register with that head. The portion of the background between the leading edge of the portrait frame and the leading edge of the portrait will enable the tuned amplifier to provide one validating signal, and the portion of the background between the trailing edge of the portrait and the trailing edge of the portrait frame will enable that amplifier to provide a second validating signal. Those two validating signals will then be used to cause acceptance of the inserted bill. By requiring two separate and distinct validating signals from each inserted bill, the present invention prevents the acceptance of spurious bills which might provide one validating signal but could not provide two separate and distinct validating signals. Also, by obtaining one validating signal from the right-hand half of the inserted bill and by obtaining the other validating signal from the left-hand half of that bill, the present invention avoids the acceptance of authentic bills that have been cut or split along their transversely-extending center lines. It is therefore an object of the present invention to obtain one validating signal from the portion of the background intermediate the leading edge of the portrait frame and the leading edge of the portrait of a bill and to obtain a second validating signal from the portion of the background intermediate the trailing edge of the portrait and the trailing edge of the portrait frame of that bill.

The portions of the backgrounds that are at opposite sides of the portraits on paper currency are not uniform in width. Those variations in width are due to the fact that the backgrounds are ovate, to the fact that the portraits are not "full face," and to the fact that artistic considerations made width variations desirable. Those width variations keep the total number of vertical or horizontal grid lines in the oppositely-disposed portions of the backgrounds for the portraits of bills from being uniform; and hence those width variations make it impossible to obtain accurate and precise validating signals from those oppositely-disposed portions of the backgrounds for the portraits merely by adding up the total number of vertical or horizontal grid lines in those oppositely-disposed portions. This would be the case even if the magnetic head was in register with the longitudinally-extending or the transversely-extending center line of the inserted bill; but it is even more the case where the magnetic head is set in register with portions of the inserted bill that are laterally offset from the longitudinally-extending or the transversely-extending center line of the bill and where the bill must be tested with its portrait either upright or inverted.

The preferred embodiments of the present invention make it possible to mount the magnetic head in register with portions of the inserted bill that are laterally offset from the longitudinally-extending center line of that bill, and make it possible to obtain two accurate and precise validating signals from the oppositely-disposed portions of the background for the portrait of that bill whether that bill is inserted with its portrait upright or inverted; and they do so by responding to the phase, duration and repetition rate, rather than to the total number, of the voltage variations due to the vertical grid lines in the oppositely-disposed portions of the background for the portrait. Such an arrangement is desirable because it keeps errors in the registry of the printed area of the bill with the perimeter of the bill, due to errors in the printing or cutting of the bill, from interfering with the generation of the required validating signals. Further, such an arrangement is desirable because it enables the required validating signals to be generated by authentic bills that are not held precisely parallel to the path of movement of those bills but, instead, are slightly skewed. It is therefore an object of the present invention to test for the phase, duration and repetition rate, rather than for the total number, of the voltage variations due to the grid lines in the oppositely-disposed portions of the backgrounds for the portraits of paper currency.

The voltage variations generated by the vertical or horizontal grid lines in the oppositely-disposed portions of the backgrounds for the portrait of a bill can be fed into a tuned amplifier that will amplify them and then use them to trigger a threshold-type control element to provide validating signals. The tuned amplifier will be set to respond to a number of voltage variations that is slightly less than the minimum number of grid lines that will pass by the magnetic head as the narrower of the oppositely-disposed portions of the background for the portrait passes by that magnetic head. Consequently, each of the oppositely-disposed portions of the background for the portrait will be able to generate a validating signal. The use of a threshold-type control element is desirable because once such a control element has been triggered it can not restore itself as long as it continues to receive amplified voltage variations. However, the non-receipt of amplified voltage variations, when the portrait passes by the magnetic head, will allow the control element to restore itself. This means that if either of the backgrounds for the portrait has more grid lines than are needed to trigger the threshold-type control element, the additional grid lines will not be able to cause that control element to provide a second validating signal. Consequently, the present invention is able to obtain one, and only one, validating signal from each of the oppositely-disposed portions of the background for the portrait of an inserted bill. It is therefore an object of the present invention to feed the voltage variations, obtained by the passage of an inserted bill, into a tuned amplifier that will trigger a threshold-type control element to provide one, and only one, validating signal from each of the oppositely-disposed portions of the background for the portrait on an inserted bill.

The preferred form of tuned amplifier provided by the present invention includes a resonant circuit; and that amplifier amplifies the voltage variations obtained from the magnetic head, responds to those amplified voltage variations to provide quantums of energy, limits the maximum quantitative value of each quantum of energy, and then introduces those quantums of energy into the said resonant circuit without appreciably loading that resonant circuit. If the phase and repetition rate of those quantums of energy substantially coincide with those of the characteristic wave form of said resonant circuit, and if the duration of those quantums of energy are such that the energy in each of those quantums of energy is slightly greater than the losses of said resonant circuit at some predetermined current value of said resonant circuit, and if enough of those quantums of energy are introduced within a predetermined period of time, the value of the voltage across a predetermined part of said resonant circuit will gradually increase to a point at which a threshold-type control element will become actuated. The limiting of the maximum quantitative value of each quantum of energy coacts with the requirement that the repetition rate and the phase of those quantums of energy substantially coincide with those of the characteristic waveform of said resonant circuit and with the further requirement that the durations of those quantums of energy be such that the energy in each of those quantums of energy slightly exceed the losses of said resonant circuit at some predetermined current value of said resonant circuit, to enable said resonant circuit to interact with the control element to pass a certain band of frequencies and to provide virtually infinite rejection of all other frequencies. This is very desirable because it enables the current detector provided by the present invention to reject spurious paper currency that is printed with magnetic ink but that does not provide voltage variations which have the requisite phase, duration and repetition rate. It is therefore an object of the present invention to provide a tuned amplifier that has a resonant circuit and that amplifies voltage variations, responds to those amplified voltage variations to provide quantums of energy, limits the maximum quantitative value of each quantum of energy, and then introduces those quantums of energy into said resonant circuit, without appreciably loading that resonant circuit, to enable said resonant circuit to operate a control element.

The low signal-to-noise levels of the voltage variations, generated when the inserted bill is moved past the air gap of the magnetic head, make it necessary to base the identification of authentic paper currency on the checking of a large number of grid lines. If the identification of authentic paper currency were to be based upon the checking of just three, four or five grid lines, three, four or five voltage variations due to noise could cause the acceptance of spurious paper currency. Any such acceptance of spurious paper currency would be objectionable, and it is avoided in the present invention by basing the identification of authentic paper currency on the checking of a large number of grid lines. Thus, the present invention bases the identification of authentic paper currency upon the checking of a minimum of twelve grid lines; six of those grid lines being intermediate the leading edge of the background frame and the leading edge of the portrait, and the other six grid lines being intermediate the trailing edge of the portrait and the trailing edge of the background frame. It is therefore an object of the present invention to provide a currency detector that bases the identification of authentic paper currency upon the checking of a minimum of twelve grid lines in the portrait backgrounds of inserted bills.

To keep the voltage variations generated by one, two, three, four or five grid lines from effecting the actuation of the control element, the present invention limits the maximum amplitude of all voltage variations generated as the inserted bill passes the air gap of the magnetic head. As a result, the resonant circuit can not experience a rapid rise of voltage that would trigger the control element. Instead, the resonant circuit must experience a controlled cumulative voltage growth as the six or more voltage variations from the six or more grid lines are introduced into the resonant circuit. In this way, full checking of six or more grid lines is attained and definite identification of authentic paper currency results. It is therefore an object of the present invention to provide a tuned amplifier that limits the maximum amplitude of the voltage variations being translated thereby and that introduces those limited voltage variations into a resonant circuit to effect a controlled cumulative voltage in that resonant circuit.

It is important and desirable to be able to pass a certain band of frequencies and to reject all other frequencies. It is even more important to be able to pass a certain band of frequencies and to provide virtually infinite rejection of all other frequencies. Where this is done, more of the frequency spectrum can be utilized effectively because less of that frequency spectrum is needed to space apart the various bands of frequencies. The present invention makes it possible to pass a certain band of frequencies and to provide virtually infinite rejection of all other frequencies; and it is therefore an object of the present invention to pass a certain band of frequencies and to provide virtually infinite rejection of all other frequencies.

The present invention is enabled to pass a certain band of frequencies and to provide virtually infinite rejection of all other frequencies by providing a resonant circuit, by providing a control element that has a high threshold value, and by introducing energy, into said resonant circuit, which has a maximum quantitative value that does not exceed a predetermined value, which has a quantitative value that is slightly greater than the losses of said resonant circuit at some predetermined current value of said resonant circuit, which has a repetition rate and phase substantially coincident with those of the characteristic waveform of said resonant circuit, and which is supplied in sufficient quantity within a predetermined period of time to enable the voltage across a predetermined part of said resonant circuit to rise to a point where said control element will operate. That energy can be in the form of a generated waveworm, a modulation, or voltage variations. Where that energy is initially formed in such a way that its quantitative value is within the required limits, neither limiting nor amplification of that energy will be required; but where that energy is not initially formed in such a way that its quantitative value is within the said limits, limiting or amplification will be provided as required. In each case, the said resonant circuit will, if the energy has the required quantitative value and has the required repetition rate and phase, and if sufficient quantities of that energy are introduced within a predetermined period of time, experience a sufficient increase in the voltage across a predetermined part thereof to operate the control element. It is therefore an object of the present invention to provide a resonant circuit, to provide a control element that has a high threshold value, and to introduce energy, into said resonant circuit, which has a maximum quantitative value that does not exceed a predetermined value, which has a quantitative value that is slightly greater than the losses of said resonant circuit at a predetermined current value of said resonant circuit, which has a repetition rate and phase substantially coincident with those of said resonant circuit, and which is supplied in sufficient quantity within a predetermined period of time to enable the voltage across a predetermined part of said resonant circuit to rise to a point where said control element will operate.

The grids in the portrait backgrounds of the paper currency of the United States of America vary slightly with the denomination of that paper currency. By properly adjusting the tuned amplifier of the present invention, it is possible to differentiate between authentic one dollar bills and authentic bills of the United States of America having different denominations. As a result, the currency detector of the present invention can not only distinguish between spurious paper currency and authentic paper currency, but it can also differentiate between authentic paper currency having different denominations. It is therefore an object of the present invention to provide a currency detector that can differentiate between authentic paper currency having different denominations.

The currency detector provided by the present invention is provided with an overlevel control which will prevent the acceptance of inserted bills that have ink with excessive magnetic properties. This overlevel control will reject any spurious bills that have unduly strong magnetic ink, and the tuned amplifier of the currency detector will reject any spurious bills that have insufficiently strong magnetic ink. As a result, a counterfeiter would not only have to match the spacing and widths of the grid lines in the backgrounds of the portraits of bills, but he would also have to match the magnetic properties of the ink used. It is therefore an object of the present invention to provide an overlevel control for a currency detector.

Other and further objects and advantages of the present invention should become apparent from an examination of the drawing and accompanying description.

In the drawing and accompanying description several embodiments of the present invention are shown and described but it is to be understood that the drawing and accompanying description are for the purpose of illustration only and do not limit the invention and that the invention will be defined by the appended claims.

Figure 2:
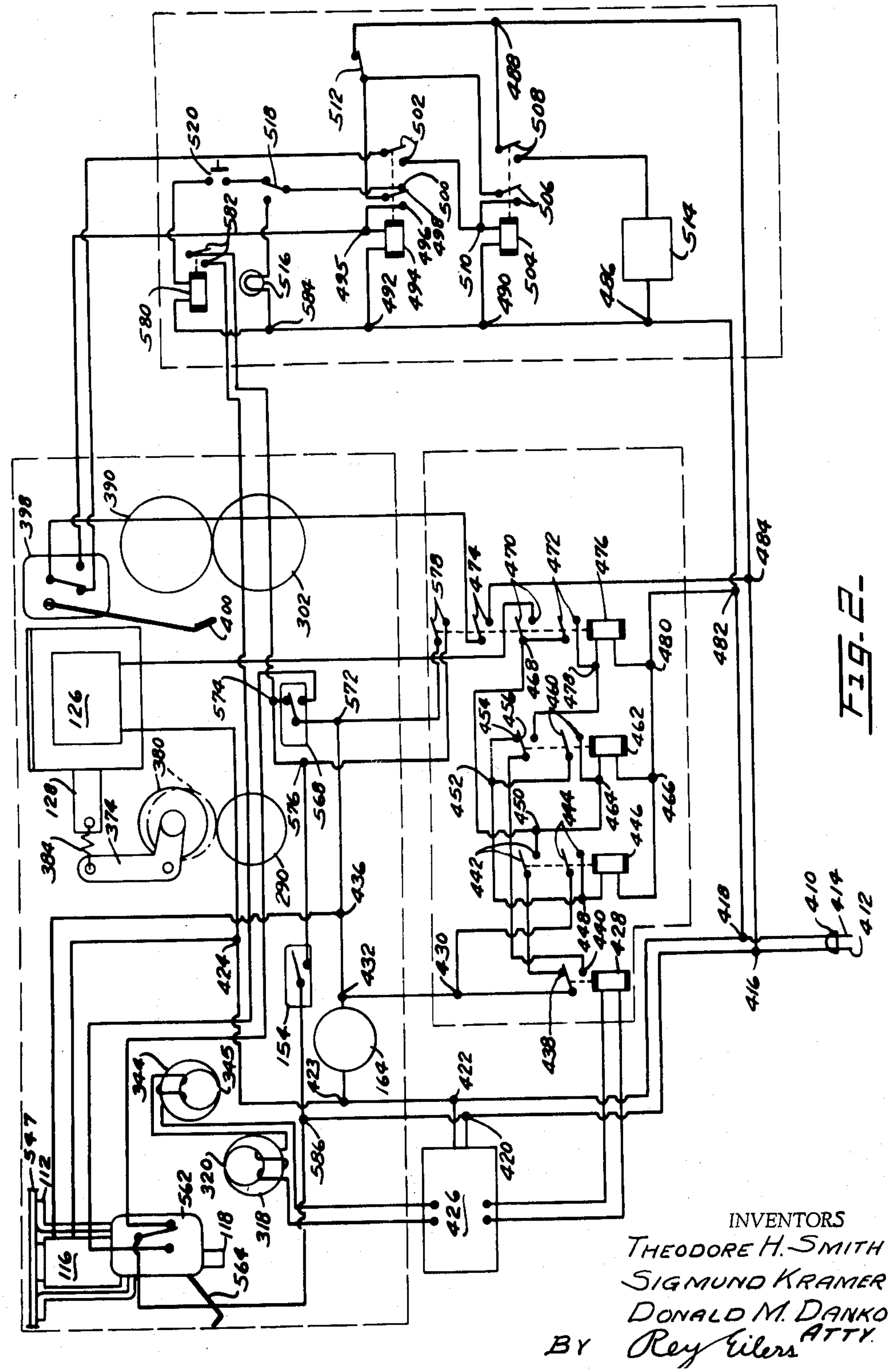
Figure 3:
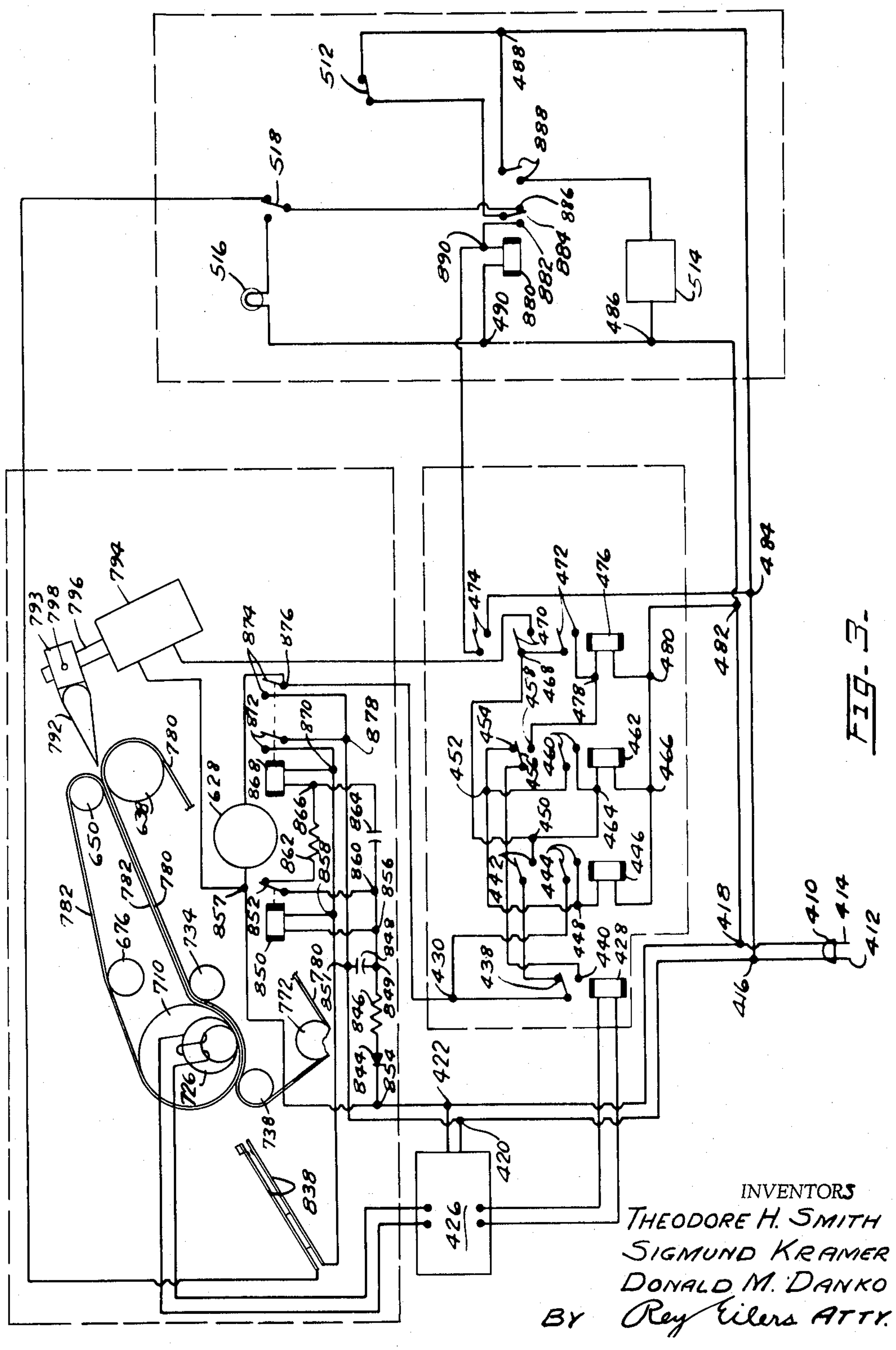
Figure 4:
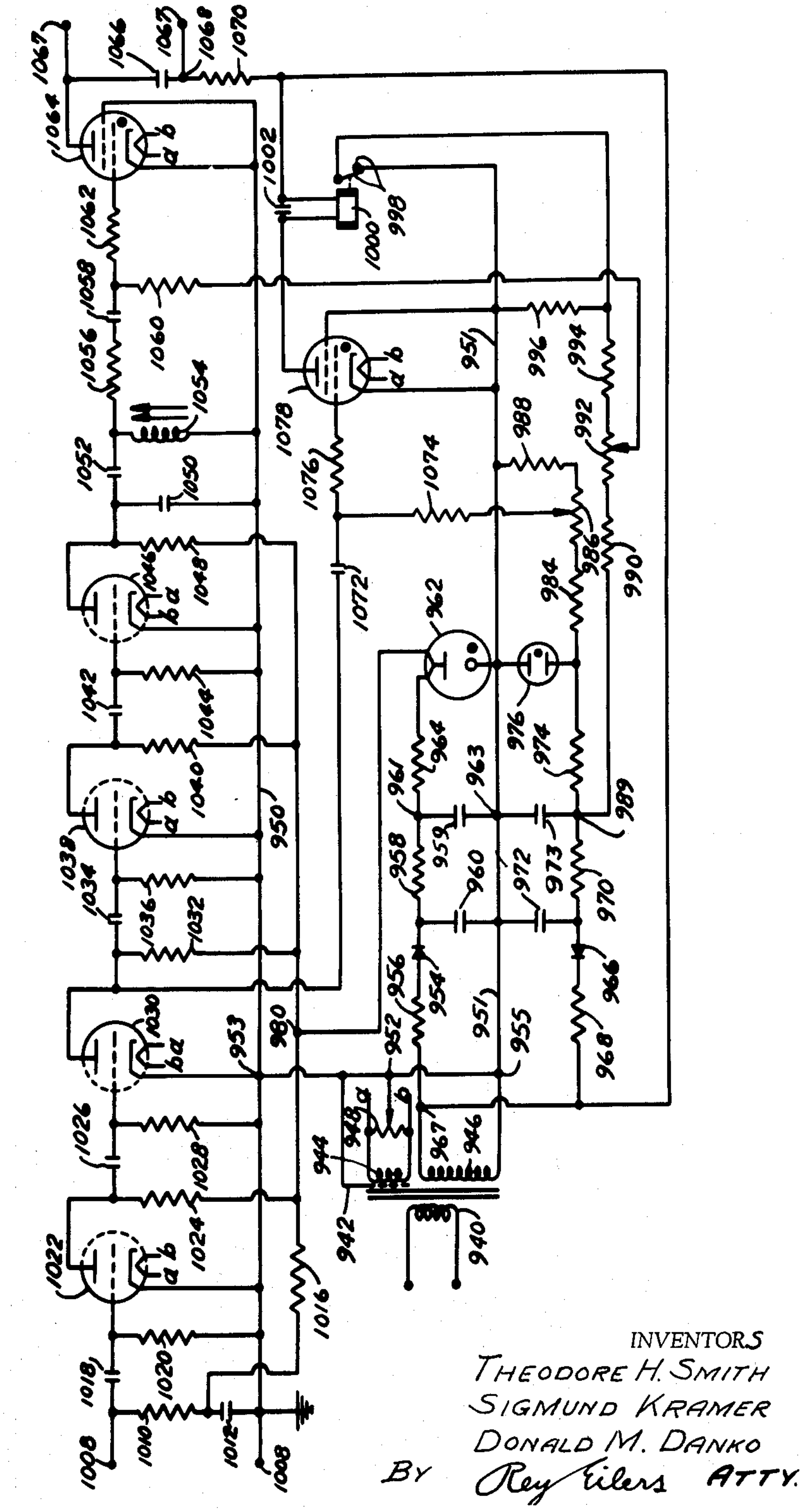
Figure 5A:
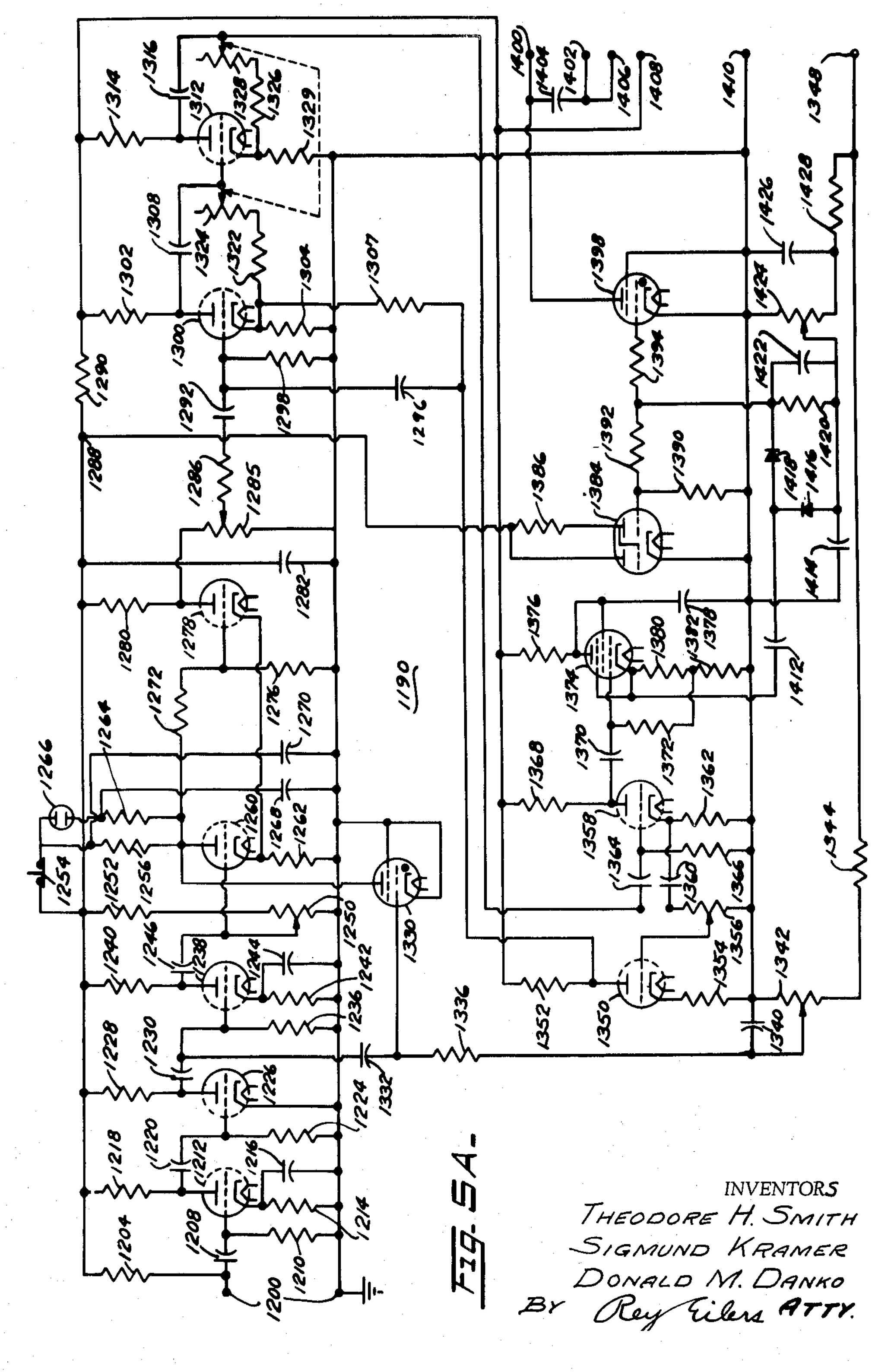
Figure 5B:
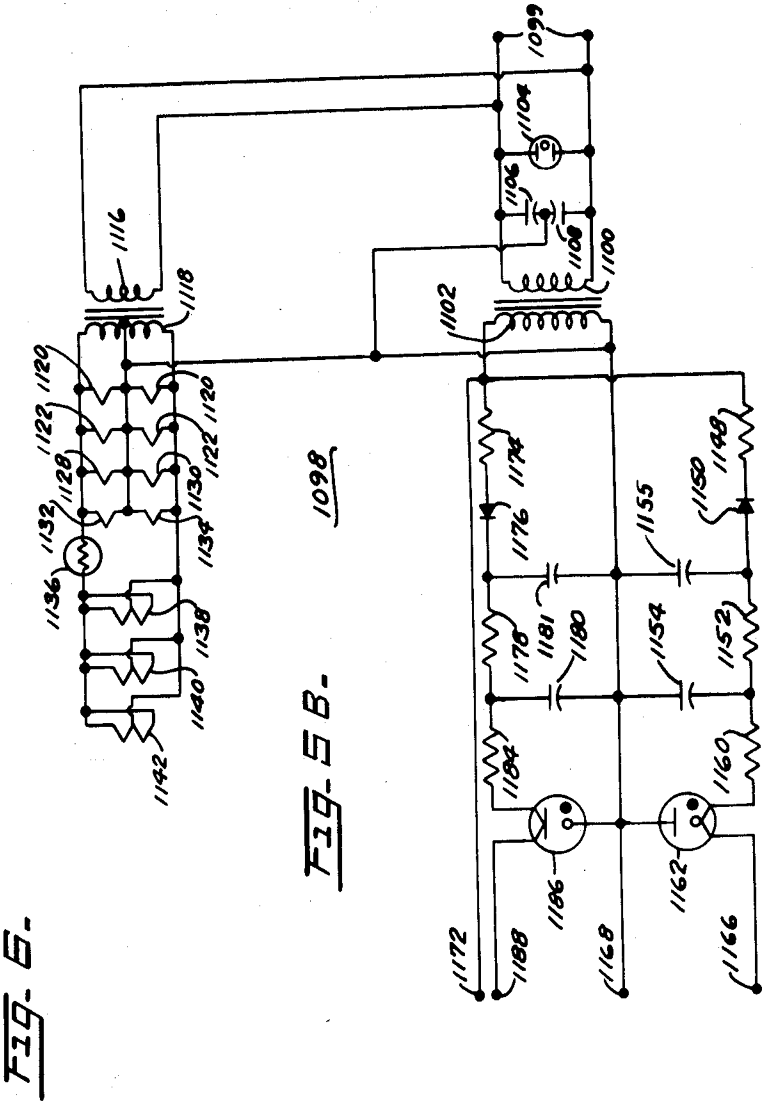
Figure 6:
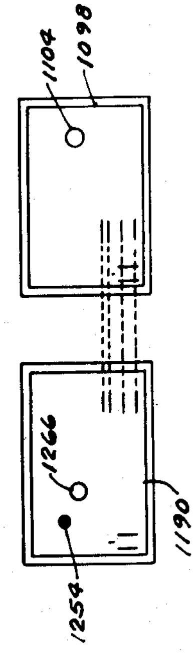
Figure 7:
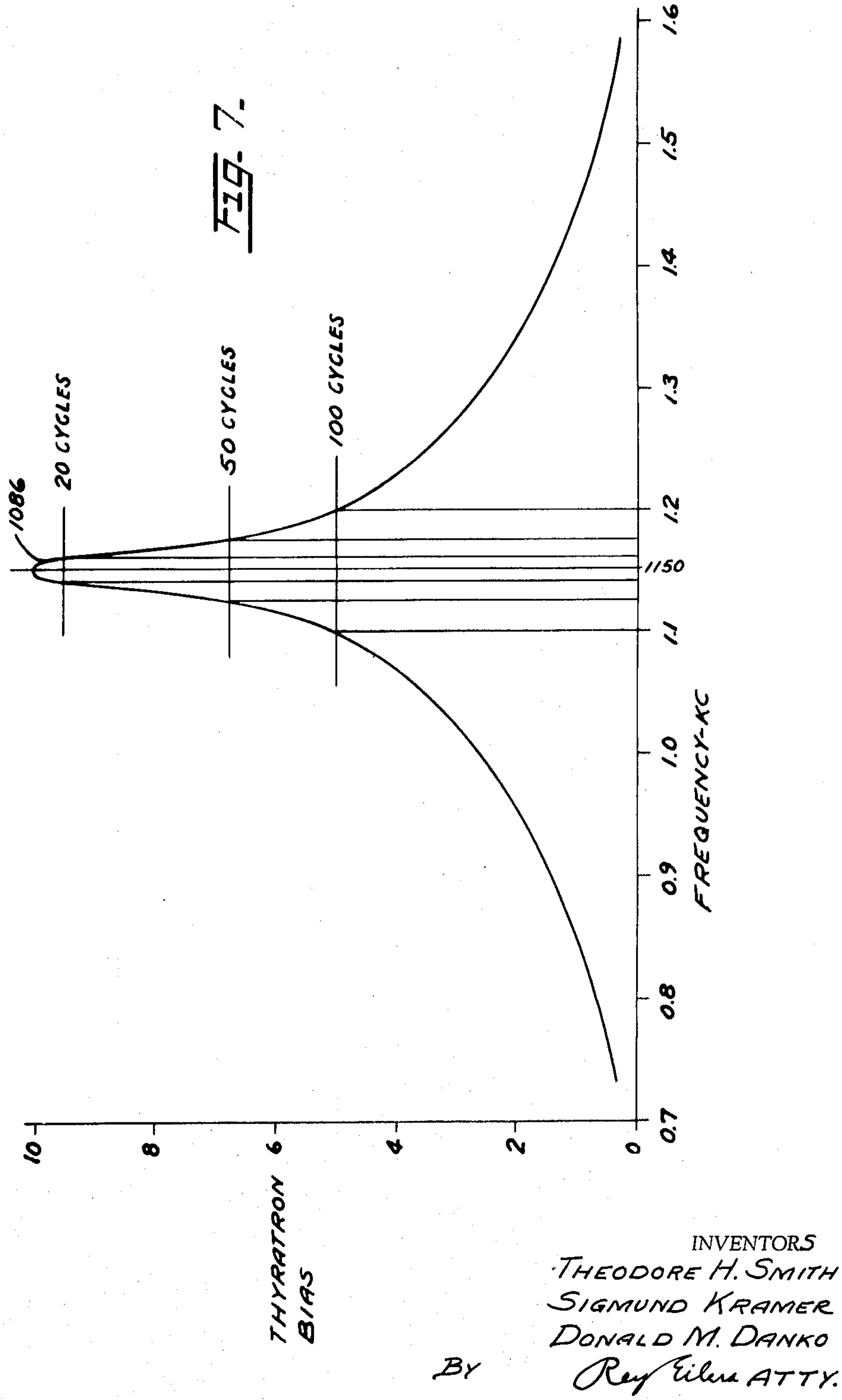
Figure 8:
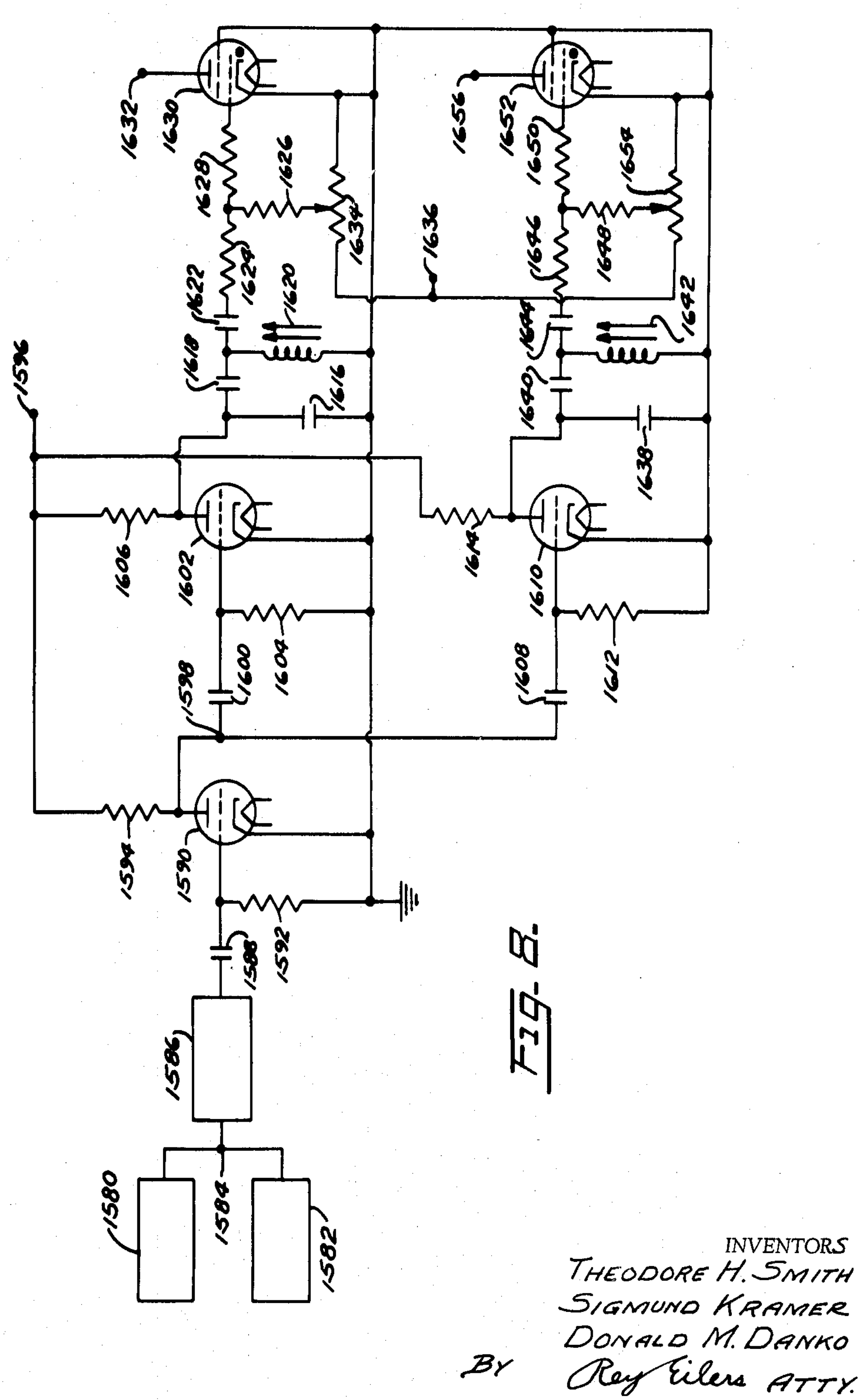
Figure 9:
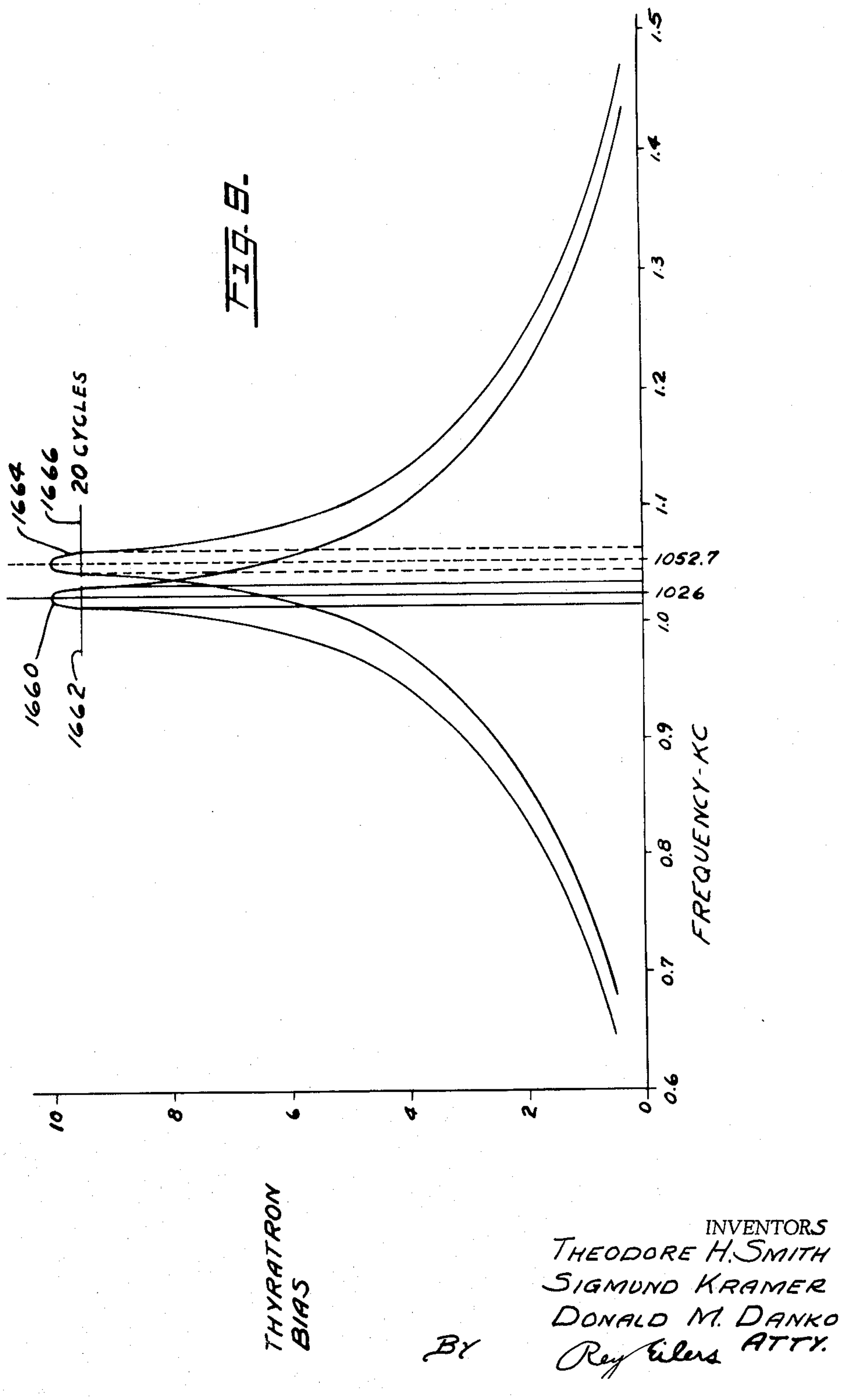
Figure 10:
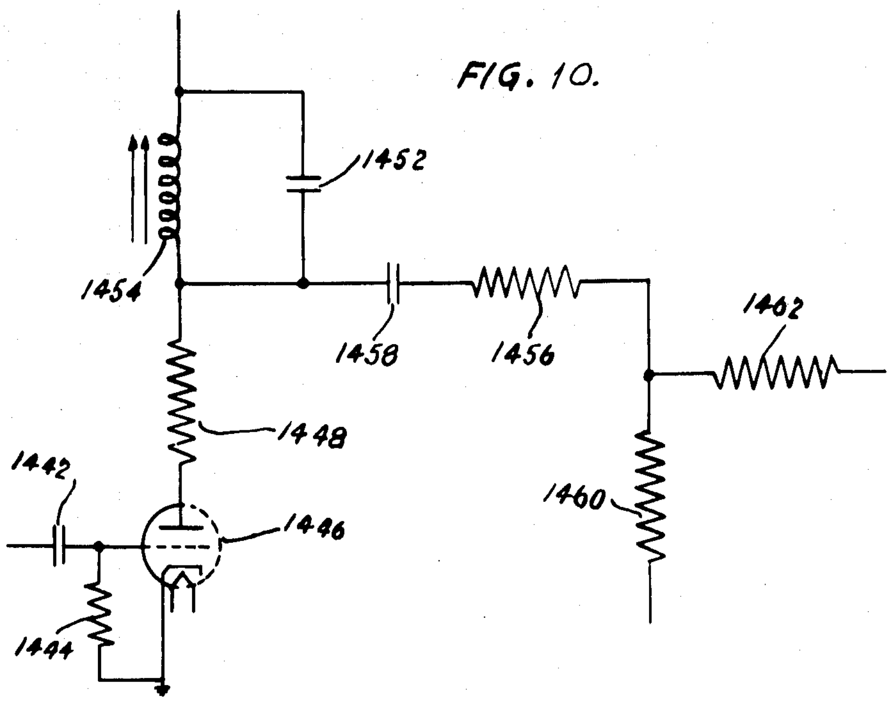
Figure 11:
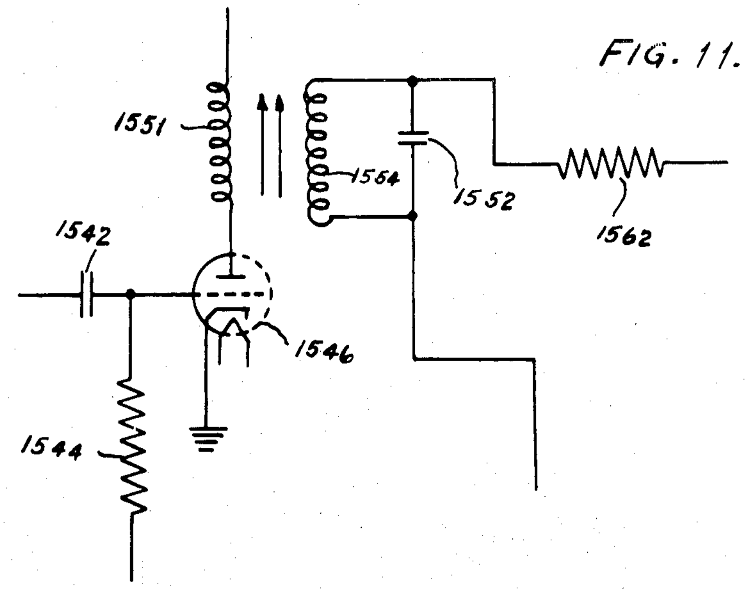

In the drawing:

FIG. 1 is the wiring diagram of the first of the currency detectors in the said application, FIG. 2 is the wiring diagram of the second of the currency detectors in the said application, FIG. 3 is the wiring diagram of the third of the currency detectors in the said application, FIG. 4 is the wiring diagram of a preferred form of tuned amplifier and control element usable with any of the currency detectors of FIGS. 1–3, FIG. 5A is the wiring diagram of part of another form of tuned amplifier and control element provided by the present invention, FIG. 5B is the wiring diagram of the rest of the tuned applifier and control element of FIG. 5A, FIG. 6 is a schematic view showing how the portions of the amplifier and control element of FIGS. 5A and 5B are connected together, FIG. 7 is the frequency response curve of the tuned amplifier of FIG. 4, FIG. 8 shows the circuit of a multi-channel tuned amplifier and of the control elements therefore, FIG. 9 shows response curves obtainable with the circuit of FIG. 8, FIG. 10 is a wiring diagram of an alternate way of feeding the resonant circuit of FIG. 4, and FIG. 11 is a wiring diagram of another alternate way of feeding the resonant circuit of FIG. 4.

Referring particularly to FIG. 1, the numeral 410 denotes a male plug that can be inserted in the standard and usual female receptacle for one hundred and ten volt alternating current. That plug has prongs 412 and 414. The prong 412 is connected to the movable contact of the switch 154 through a conductor which has junctions 416 and 420 intermediate the ends thereof. The prong 414 is connected to one of the terminals of the solenoid 126 by a conductor which has the junctions 418, 422, 423 and 424 intermediate the ends thereof. The junction 423 is connected to one terminal of the motor 164, and the junction 424 is connected to one terminal of the solenoid 116. The junctions 420 and 422 are connected to the power input terminals of a unit 426 that includes a tuned amplifier and a control element. The tuned amplifier and control element shown by FIG. 4 will preferably be used in the unit 426, but the tuned amplifier and control element of FIGS. 5A and 5B could be used. One terminal of the serially-connected coils of the magnetic head 318 is connected to one of the signal input terminals of the unit 426. The other terminal of the serially-connected coils of head 318 is connected to one of the terminals of the serially-connected coils of the magnetic head 344; and the other terminal of the serially-connected coils of the head 344 is connected to the other signal input terminal of the unit 426. As a result, all four coils of the heads 318 and 344 are connected in series between the signal input terminals of the unit 426.

The output terminals of the unit 426 are connected to the coil of a relay 428 which has a fixed contact 438, a fixed contact 440, and a movable contact. The relay 428 is one of a chain of relays 446, 462 and 476. The relay 446 has two pairs of normally-open contacts 442 and 444, the relay 462 has a pair of normally-open contacts 460 plus a movable contact 456 that is selectively engageable with fixed contacts 454 and 458, and relay 476 has three pairs of normally-open contacts 470, 472 and 474.

The components of the vending machine of FIG. 1 are enclosed by a dashed line, and they include an "empty lamp" 516, and "empty switch" 518, a push button 520, a "delivery switch" 512, a cycling mechanism 514, and two relays 494 and 504. The relay 494 has a pair of normally-open contacts 502 plus a movable contact 498 that is selectively engagable with fixed contacts 496 and 500. The relay 504 has two pairs of normally-open contacts 506 and 508. The empty lamp 516 and the push button 520 will be located at the exterior of the vending machine. The push button 520 will be pressed by patrons, in accordance with instructions on the exterior of the vending machine, after those patrons have inserted bills.

Referring particularly to FIG. 2, the switch 562 has its movable contact connected to the prong 412 of plug 410 by junctions 586, 420 and 416. The left-hand fixed contact of that switch is connected directly to the fixed contact 582 of relay 580; and the right-hand fixed contact of that switch is connected directly to the lower fixed contact of switch 568. The movable contact of switch 568 is connected to the motor 164 by junctions 572, 436 and 432, and it is connected to the movable contact 578 of relay 476 by the junction 572. The movable contact of switch 568 is also connected to movable contact 444 of relay 446 and to the movable contact of relay 428 by junctions 572, 436, 432 and 430. The upper fixed contact of switch 568 is connected to the movable contact 582 of relay 580 by junction 574; and it is connected to the fixed contact of switch 154 by the junctions 574 and 576, and is connected to the fixed contact 578 of relay 476 by junctions 574 and 576.

Referring particularly to FIG. 3, the numeral 426 denotes a unit which has the signal input terminals thereof connected to the series-connected coils on the core of the magnetic head 726. The output terminals of the unit 426 are connected to the coil of a relay 428, and that relay is part of a chain of relays that is identical to the chain of relays shown in FIG. 1 The numeral 844 denotes a metallic rectifier; and the numeral 846 denotes a typical current-limiting resistor used to protect metallic rectifiers. The numeral 848 denotes a capacitor, and the numeral 850 denotes a relay which has a pair of normally closed contacts 852. The numeral 862 denotes a resistor, and the numeral 864 denotes a capacitor. A relay 868 has a pair of normally-open contacts 872 and a pair of normally-open contacts 874.

A vending machine, with which the currency detector of FIG. 3 can be used, has an empty lamp 516 and an empty switch 518. That vending machine also has a delivery switch 512 and a cycling device 514. Furthermore, that vending machine has a relay 880 which has a pair of normally-open contacts 888 and a movable contact 884 that is normally in engagement with a fixed contact 886 but can respond to the energization of the coil of that relay to move into engagement with a fixed contact 882.

The structure and operation of the three currency detectors, whose circuits are shown in FIGS. 1–3, are described in detail in the said application. Hence, that structure and operation need not be described in detail herein.

*Tuned amplifier and control element of FIG. 4*

Referring to FIG. 4, the numeral 940 denotes the primary winding of a transformer, and that winding can be connected to the junctions 420 and 422 of FIGS. 1–3. That transformer has a secondary winding 944 that provides a low voltage and has a secondary winding 946 that provides a high voltage. An electrostatic shield 942 is provided for the transformer 940; and that shield tends to isolate the secondary winding 944 from noise, stray signals and unwanted modulations at the plug 410.

The winding 944 supplies the filament voltage for vacuum tubes 1022, 1030, 1038 and 1946 and for the control elements 1064 and 1078. The tubes 1022 and 1030 are shown as being the halves of a duotriode, and the tubes 1038 and 1046 are shown as being the halves of another duotriode. The terminal *a* of the winding 944 will be connected to the terminals *a* of the various tubes 1022, 1030, 1038 and 1046 and of the control elements 1064 and 1078; and the terminal *b* of that winding will be connected to the terminals *b* of those tubes and of those control elements.

The winding 944 is shunted by a tapped voltage divider 948. The movable contact of that voltage divider is connected to a conductor 951 by junctions 952 and 955, and that movable contact is connected to a conductor 950 by junctions 952 and 953. One end of the conductor 950 is connected to the lower terminal of a pair of input terminals 1008, and that lower terminal is grounded.

The D.C. operating voltages required for the tubes 1022, 1030, 1038 and 1046 and for the control elements 1064 and 1078 are derived from the winding 946. Thus a rectifier 954 is connected across winding 946 in series with a resistor 956 and a condenser 960. Series-connected resistors 958 and 964 and a condenser 959, connected as shown, are utilized to complete a suitable filter circuit. A voltage regulator tube 962 is connected in series with resistor 964 across terminals 961 and 963. A D.C. voltage derived from this filter circuit is supplied to the anode of each of tubes 1022, 1030, 1038 and 1046 through the junction designated by the reference numeral 980. The other side of this filter circuit is connected to ground.

Bias for the control element 1064 is derived from winding 946 through a rectifier circuit which includes a rectifier 966 connected across winding 946 in series with a resistor 968 and a condenser 972 which also forms a part of a second filter circuit. This second filter circuit includes a second capacitor 973 and series-connected resistors 970 and 974, all connected as illustrated in the drawing. A voltage regulator tube 976 is connected in series with resistor 974 across the condenser 973 as illustrated. Bias for the control element 1064 is supplied from a junction 989 through a resistor 990, the adjustable tap of a resistor 992, and a resistor 1060. The right-hand end of the resistor 992 is connected to ground through a resistor 994 and a resistor 996. The normally closed contacts 998 of a relay having an operating coil designated by the reference numeral 1000 are connected across the resistor 996.

A suitable D.C. bias is provided for control element 1078 through an adjustable tap on a resistor 986. That resistor is connected in series with a resistor 984 and a resistor 988 across the voltage regulator tube 976. The voltage derived from the tap on resistor 986 is applied to the grid of control element 1078 through a resistor 1074 and the resistor 1076.

A.C. voltage is applied to the anode of control element 1064 by resistor 1070, junction 1068, and parallel-connected capacitor 1066 and relay coil 428; that relay coil being shown in FIGS. 1–3. A.C. voltage is applied to the anode of control element 1078 by parallel-connected condenser 1002 and relay coil 1000.

The series-connected coils of the serially-connected magnetic heads 318 and 344 of FIGS. 1 and 2 or the series-connected coils of the magnetic head 726 of FIG. 3 will be connected to the signal input terminals 1008. For brevity and simplicity of explanation, it will be assumed that the terminals 1008 are connected to the series-connected coils on the magnetic heads 318 and 344. Further, it will be assumed that the black-ink face of the inserted authentic one dollar bill of the United States of America will engage the air gap 320 of the magnetic head 318.

A D.C. biasing current for the magnetic heads connected to the signal input terminals 1008 is derived from the winding 946. That biasing current is supplied through a resistor 1010 and a resistor 1016 which are interposed between the upper input terminal 1008 and the junction 980. The resistor 1016 and a condenser 1012 provide a filtering and isolating action for the bias on the magnetic heads.

The tubes 1022 and 1030 are included in a pre-amplifier for amplifying the voltage variations which are generated within the coils of magnetic head 318 and which are supplied to the input terminals 1008. Bias voltage is supplied and preserved for tube 1022 through the action of a coupling condenser 1018, connected between the upper terminal 1008 and the grid of the tube, and a grid-leak resistor 1020, connected between the grid and cathode of the tube. The voltage variations generated within the magnetic coils of the magnetic head 318 will be coupled to the grid of tube 1022 by the condenser 1018.

The signal output from tube 1022 is derived across a load resistor 1024 and is applied to the grid of tube 1030 through a coupling condenser 1026. A load resistor 1032 is provided for tube 1030 and the cathodes of tubes 1022 and 1030 are grounded. A grid leak resistor 1028 is provided for tube 1030.

The signal output of tube 1030 is translated by a limiter which comprises an over-driven amplifier: a tube 1038 and a tube 1046. The cathodes of these tubes are grounded and the signal output from tube 1030 is applied to the grid of the tube 1038 through a coupling condenser 1034. A grid-leak resistor 1036 is provided for tube 1038. A load resistor 1040 is provided for tube 1038 and the signal output from this tube is applied to the grid of tube 1046 through a coupling condenser 1042. A grid-leak resistor 1044 and an anode resistor 1048 are provided for tube 1046.

A tuned circuit that includes an inductor 1054 and capacitors 1050 and 1052 is provided for translating the signal output derived from tube 1046. Thus the common junction of condensers 1050 and 1052 is connected to the anode of tube 1046, while the junction common to capacitor 1050 and inductor 1054 is grounded.

A threshold-type control element which is adapted to be triggered by the output derived from tuned circuit 1050, 1052 and 1054 is provided. In the embodiment illustrated in FIG. 4; this threshold device is a thyratron tube 1064 having a grounded cathode; but mechanical as well as other electronic threshold-type control elements could be used. The signal output from the tuned circuit 1050, 1052 and 1054 is applied to the grid of tube 1064 through a resistor 1056, a condenser 1058 and a resistor 1062. An output voltage is derived from the circuit of FIG. 4 through the terminals 1067 connected across condenser 1066. This voltage output is utilized to operate the relay chains of FIG. 1, FIG. 2 or FIG. 3 and thus cause the acceptance of the inserted bill.

As the inserted bill 524 is moved past the air gap 320 of the magnetic head 318, the portion of the portrait background intermediate the leading edge of the background frame and the leading edge of the portrait will generate one set of voltage variations, and the portion of the portrait background intermediate the trailing edge of the portrait and the trailing edge of the background frame will generate a second set of voltage variation. Those voltage variations will be supplied to the input terminals 1008 and will be coupled to the grid of tube 1022 by the condenser 1018. The tube 1022 and the tube 1030 amplify those voltage variations, and the limiter which includes the tubes 1038 and 1046 limits the amplitude of those voltage variations. The tubes 1038 and 1046 are biased to operate with anode-current saturation for signal inputs of a predetermined amplitude level, thereby to provide an amplitude-limited output signal in a manner which, per se, is well understood by those skilled in the art.

The voltage variations obtained during the magnetic sensing of authentic currency of the United States of America can vary in amplitude over a range as great as one hundred to one; and if the amplitude of those voltage variations was not limited, the larger-amplitude voltage variations could cause the voltage across the resonant circuit 1050, 1052, 1054 to rise almost immediately to a value that would cause triggering of the control element 1064. Any such rise would be objectionable because positive and definite identification of authentic paper currency is best attained by the checking of six or more grid lines in each of the oppositely-disposed portions of the portrait background. By limiting the amplitude of the voltage variations received from the pre-amplifier, the limiter prevents a rapid rise in the voltage across the resonant circuit; and, instead, helps provide the important controlled cumulative voltage growth in that resonant circuit.

The condenser 1050 performs a dual function in the operation of the tuned amplifier of FIG. 4. Specifically, that condenser constitutes part of the capacitance of the resonant circuit 1050, 1052, 1054 and it also serves as a coupling device which injects the amplitude-limited voltage variations from the tube 1046 into that resonant circuit. The condenser 1050 is a desirable coupling device because its value may be so chosen that resistor 1048 and the tube 1046 will not appreciably load the resonant circuit. The inductor 1054 should have a high Q; and while different inductors could be used, a Burnell adjustoroid inductor is very useful.

The resonant circuit 1050, 1052, 1054 will have a characteristic frequency that is substantially equal to the repetition rate of the grid lines on the inserted bill; and by repetition rate is meant the number of grid lines that could pass the air gap in one second if there were an unlimited number of grid lines in the oppositely-disposed portions of the portrait background. That characteristic frequency will preferably be in the range of from one thousand to two thousand cycles per second. When the repetition rate, the phase and the duration of the voltage variations supplied to the input terminals 1008 are those of voltage variations of an authentic one dollar bill of the United States of America, the pre-amplifier and the limiter will supply to the condenser 1050 a succession of quantums of energy that have a repetition rate and phase that substantially coincide with those of the resonant circuit. Furthermore, the maximum quantitative value of each of those quantums of energy will be fixed; and the value of the energy in each of those quantums of energy will exceed the losses of the resonant circuit at a predetermined current value of that resonant circuit. The condenser 1050 will inject those quantums of energy into the resonant circuit, and the voltage across the inductor 1054 will experience a controlled cumulative growth. After an average of nine of the quantums of energy have been injected into the resonant circuit, the voltage across that inductor will rise to the point where the control element 1064 will trip.

That control element will be so biased by adjustment of the tap on resistor 992 that it can coact with the characteristic wave form of the resonant circuit 1050, 1052 and 1054 to determine the repetition rates of the voltage variations that can effect tripping of the control element 1064. For example, in FIG. 7 the resonance curve of tuned circuit 1050, 1052, 1054 is shown. The ordinate in FIG. 7 represents volts, and the abscissa represents frequency in kilocycles per second. The tuned circuit, in the case illustrated, is resonant at a frequency of eleven hundred and fifty cycles. It will be seen from the curve of FIG. 7 that if the control element 1064 is so biased that a voltage somewhat greater than nine and one-half volts is required from the tuned circuit to trip that control element, only signals within a very narrow frequency range can trip that control element. As a matter of fact, only signals within a range of about twenty cycles per second are effective to trip the thyratron 1064 under these conditions. A voltage of slightly more than six volts will provide an effective bandwidth of about fifty cycles per second and a voltage of about five volts will provide a bandwidth of about a hundred cycles per second.

This means that if the thyratron 1064 is set to fire when the voltage across inductor 1054 reaches five volts, voltage variations due to noise or an unacceptable bill that have repetition rates above twelve hundred cycles per second and below eleven hundred cycles per second can never increase the voltage across the inductor 1054 sufficiently to trip that thyratron. As a result, the tuned amplifier and control element of FIG. 4 can provide an infinite rejection of all voltage variations that do not have repetition rates falling within a hundred cycle band. If the bias of thyratron 1064 is increased so the voltage across inductor 1054 must be slightly more than six volts, voltage variations due to noise or an unacceptable bill that have repetition rates above eleven hundred and seventy-five cycles per second and below eleven hundred and twenty-five cycles per second can never increase the voltage across the inductor 1054 sufficiently to trip that thyratron. As a result, the tuned amplifier and control element of FIG. 4 can provide an infinite rejection of all voltage variations that do not fall within a fifty cycle band. If the bias of thyratron 1064 is increased so slightly more than nine and one-half volts must appear across inductor 1054 voltage variations due to noise or an unacceptable bill that have repetition rates above eleven hundred and sixty cycles per second and below eleven hundred and forty cycles per second can never increase the voltage across the inductor 1054 sufficiently to trip the thyratron. As a result, the tuned amplifier and control element of FIG. 4 can provide infinite rejection of all voltage variations that do not fall within a twenty cycle band. In actual practice, the rejection of all voltage variations having repetition rates outside a twenty cycle, or even a fifty cycle, band of frequencies is not essential; and it is quite adequate to set the bias of the thyratron 1065 so voltage variations having repetition rates outside a hundred cycle band of frequencies will be incapable of increasing the voltage across the inductor 1054 sufficiently to trip that thyratron.

To produce the desired controlled cumulative growth of voltage across the inductor 1054, the voltage variations injected into the resonant circuit 1050, 1052, 1054 must have the required phase, repetition rate, durations and quantitative values. Furthermore, a predetermined minimum number of those voltage variations must be injected into the resonant circuit within a predetermined period of time. The number of voltage variations that must be injected into that resonant circuit within a predetermined period of time to trip the control element is a function of the maximum quantitative value of each limited voltage variation and of the bias on that control element. Specifically, if it was desired to use fewer voltage variations to effect the tripping of the thyratron 1064, the limiter could be set to provide each voltage variation with a greater maximum quantitative value, or the thyratron could be given a smaller bias. Conversely, if it was desired to require more voltage variations to effect the tripping of the thyratron 1064, the limiter could be set to provide each voltage variation with a lesser maximum quantitative value, or the thyratron could be given a greater bias. The number of voltage variations required to trip the thyratron 1046 should not be less than six; and it is desirable, where the repetition rate of the voltage variations exactly coincides with the resonant frequency of the resonant circuit, that nine voltage variations be required to trip the thyratron 1064. The nine voltage variations and the resulting controlled cumulative growth of voltage give full assurance that the voltage variations which trip the thyratron were generated by the grid lines in the leading or trailing half of the portrait background of an authentic dollar bill.

If the voltage variations introduced into the resonant circuit have too short a duration or have too small an amplitude, they will not add enough energy to that resonant circuit to effect the controlled cumulative growth in voltage that is needed to trip the thyratron. As a result, the tuned amplifier and control element of the present invention can reject a spurious bill that generates voltage variations which have the required repetition rate but do not have the required duration and amplitude.

If the voltage variations introduced into the resonant circuit maintain substantially the same repetition rate but drift out of phase with the characteristic waveform of the resonant circuit, those voltage variations will, in part at least, buck rather than aid the growth of voltage across the inductor 1054 and thereby keep that voltage from growing sufficiently to trigger the thyratron 1064. Consequently, the tuned amplifier and control element provided by the present invention can reject a bill that generates voltage variations which have the required repetition rate but which do not have the required phase.

The controlled cumulative growth of voltage in the resonant circuit, which is so important in the operation of the tuned amplifier and control element of FIG. 4, depends in large part upon the limiting action of the limiter. Without that limiting action, one or two voltage variations of large amplitude could cause the voltage across the inductor 1054 to rise sufficiently to trip the thyratron 1064. Such rapid growth would be very undesirable because noise or an unacceptable bill could easily produce such voltage variations. Consequently, the effective operation of the tuned amplifier and control element of FIG. 4 is dependent upon the action of the limiter, the resonant circuit and the control element in providing the controlled cumulative growth of voltage needed to trip that control element.

When the voltage across the inductor 1054 reaches the required level, the resistor 1056 and condenser 1058 will couple that voltage to the grid of thyratron 1064 and cause that thyratron to trip. The resistor 1056 is desirable because it prevents an appreciable loading of the resonant circuit 1050, 1052, 1054. That resistor thus coacts with the condenser 1050 to withdraw energy from and to introduce energy into that resonant circuit without appreciably loading that resonant circuit. As a result, the resonant circuit can have a high Q.

When the thyratron 1064 is tripped, alternating current will flow from the upper end of winding 946, through resistor 1070, past the lower terminal 1067, through the coil 428 of the relay chain of FIG. 1, 2 or 3, past the upper terminal 1067, through the thyratron 1064 to conductor 950, and then past junctions 953, 952, and 955 to the lower end of winding 946. That flow of alternating current will energize the relay coil 428 and initiate the operations described in the said application with regard to the currency detectors whose circuits are shown in FIGS. 1–3. If further voltage variations having the required phase, repetition rate, duration and quantitative values are introduced into the resonant circuit 1050, 1052, 1054, those voltage variations will cause a further growth in the voltage across the inductor 1054; but that further growth will not cause a change in the energization of the relay coil 428. Instead, that relay coil will remain energized until the voltage across the inductor 1054 falls, as it will when the grid lines of the leading half of the portrait background move beyond the air gap 320 of magnetic head 318. The falling of the voltage across the inductor 1054 will cause the thyratron to stop conducting because the anode of that thyratron is supplied with A.C. voltage; and hence that thyratron can only conduct when it has a predetermined voltage at its grid. When the thyratron stops conducting, the relay coil 428 of FIG. 1, 2 or 3 will become deenergized. If the inserted bill is an authentic dollar bill of the United States of America a second set of phase repetitive voltage variations from the other half of the portrait background will cause the desired controlled cumulative growth of voltage to occur once again in the resonant circuit. Thereupon the thyratron 1064 will again trip and again release, thereby supplying the second validating signal to the relay chain. That second validating signal will lead to the acceptance of the inserted bill, all as described in the said application.

The condenser 1066 is in parallel with the relay coil 428 of FIG. 1, 2 or 3; and that condenser will charge during the positive-going portions of the alternating current. During the negative-going portions of that alternating current, that condenser will partially discharge through the relay coil 428 and thereby keep that coil energized.

The control element 1078 is provided to enable the tuned amplifier and control element of FIG. 4 to avoid giving validating signals to the relay chain of FIG. 1, 2 or 3 when voltage variations whave have too great an amplitude are applied to the input terminals 1008. That control element is a thyratron that will energize the relay coil 1000 whenever a suitable voltage is applied to its grid. That voltage will be derived from tube 1030, and it will be applied to the grid of thyratron 1078 through a coupling condenser 1072 and the resistor 1076.

The control element 1078 is so biased by adjustment of the tap on resistor 986 that signals of a predetermined amplitude at the output of tube 1030 will trigger that control element and energize the relay coil 1000. That energization will open the contacts 998. Normally, those contacts shunt the resistor 996 and thereby enable the resistors 990, 992, and 994 to provide a moderate negative bias for the control eleemnt 1064. When the contacts 998 open, the resistor 996 is placed in series with the resistors 990, 992 and 994 and it appreciably increases the negative bias for the control element 1064. That increase in negative bias is sufficient to prevent the tripping of thyratron 1064 regardless of the phase, repetition rate, duration or amplitude of voltage variations applied to the input terminals 1008.

The thyratron 1078 is supplied with A.C. voltage, and hence that thyratron will conduct current only as long as excessively large signals are present at the output of tube 1030. However, the capacity of condenser 1002, which is connected in parallel with the relay coil 1000, is large; and even after the thyratron 1078 stops conducting, that relay coil will be kept energized by the discharging of the condenser 1002 through it. As a result, once an excessive signal appears at the output of tube 1030, the negative bias on the control element 1046 will be increased to a higher level and will be maintained at that level until after the bill has passed by the magnetic heads. In this way, full protection is provided against the acceptance of a bill that is engraved, in whole or in part, with ink having excessively strong magnetic properties.

From the foregoing it will be apparent that the tuned amplifier and control element of FIG. 4 keep the currency detector from accepting bills that produce voltage variations which do not have the required repetition rate, that do not have the required duration, that do not have the required phase, that are too weak, or that are too strong. In doing so, that tuned amplifier and control element provide maximum protection for the owners of vending machines.

*The selective amplifier and control element of FIG. 5A*

The circuit of FIG. 5A is similar to that of FIG. 4 in that it also has a pre-amplifier, a limiter, a resonant circuit and a trigger device and is effective through magnetic scanning to identify authentic paper currency of the United States of America. The elements of the circuit are, however, quite different.

The circuit of FIG. 5A includes input terminals 1200, and the lower of those terminals is grounded. A pre-amplifier is provided which includes tubes 1212, 1226 and 1238. Tubes 1212 and 1226 can each be one-half of the same 12AX7 tube. Tube 1238 can be one-half of a12AT7 tube. Coupling capacitors 1208, 1220 and 1230 are provided for these respective tubes. Similarly grid-leak resistors 1210, 1224 and 1236 are provided; and anode resistors 1218, 1228 and 1240 are provided. The cathode of tube 1226 is directly grounded while the cathodes of tubes 1212 and 1238 are respectively connected to ground through resistors 1214 and 1242. Suitable by-pass condensers 1216 and 1244 are provided for resistor 1214 and 1242, respectively.

A resistor 1204 is provided for the purpose of supplying a direct current bias to the magnetic head or heads which will be connected across the terminals 1200. For brevity and consistency it will be assumed that the series-connected coils of magnetic heads 318 and 344 are connected to the terminals 1200.

The output of the pre-amplifier which has just been described is effectively limited in a clipper circuit which includes tubes 1260 and 1278. These tubes may be the two halves of a 12AT7 tube. The cathodes of the tubes are grounded through a common cathode resistor 1262, and the anode of tube 1260 is connected to the grid of tube 1278 through a resistor 1272. Anode resistor 1256 connected in series with a normally closed pushbutton switch 1254 is provided for tube 1260. The purpose of switch 1254 will be explained in detail later. The grid of tube 1260 is coupled to the anode of tube 1238 of the pre-amplifier through a coupling condenser 1246, and it is directly connected to the adjustable tap of a resistor 1250. That resistor is connected in series with a resistor 1252 across the supply voltage for the tubes 1212, 1226, 1238, 1260 and 1278; and that voltage appears between the terminals 1288 and 1410. A by-pass condenser 1270 is provided for anode resistor 1256. A resistor 1276 is connected between the grid of tube 1278 and ground and an anode resistor 1280 is provided. Condenser 1282 coacts with resistor 1290 to isolate and decouple the anode supply of tubes 1212, 1226, 1238, 1260 and 1278.

The signal output of tube 1278 is supplied to an electronic resonant circuit through a circuit which allows the level of the signal supplied to that electronic resonant circuit to be varied. This level-setting circuit includes the resistor 1285 which has an adjustable tap and is connected between the anode of tube 1278 and ground.

The electronic resonant circuit includes a frequency-selective amplifier, having tubes 1300 and 1312 connected in cascade, and a non-selective amplifier having a tube 1350 for feeding a signal from the output circuit of tube 1312 back to the input circuit of tube 1300. Tubes 1300 and 1312 are preferably halves of the same 12AT7 tube. The grid of tube 1300 is coupled to the tap on resistor 1285 through a series-connected condenser 1292 and resistor 1286 and is connected to ground through a resistor 1298. A cathode resistor 1304 is provided for tube 1300 and a cathode resistor 1329 is provided for tube 1312. A frequency selective amplification is provided in tube 1300, and to accomplish this, a network is provided which includes series-connected resistors 1322 and 1324 and a condenser 1308. Condenser 1308 is connected between the anode of tube 1300 and the grid of tube 1312 while that grid is also coupled to the tap on resistor 1324. Anode resistors 1302 and 1314 are provided for tubes 1300 and 1312, respectively. The tube 1312 has a frequency selective network that is generally similar to that of tube 1300; and that network includes resistors 1326 and 1328 corresponding to resistors 1322 and 1324, respectively, and includes condenser 1316 corresponding to condenser 1308. The tap on resistor 1328 is connected to the grid of a buffer or isolating amplifier 1358 through a coupling condenser 1364. A grid resistor 1366 and a cathode resistor 1362 are provided for the tube 1358. This tube and tube 1350 may be the halves of the same 12AT7 tube. An anode resistor 1368 is provided for tube 1358.

A signal input for tube 1350 is derived from the cathode of tube 1358 through a coupling condenser 1360 and a resistor 1356 which has an adjustable tap to which the grid of tube 1350 is connected. A cathode resistor 1354 and an anode resistor 1352 are provided for tube 1350. The anode of tube 1350 is coupled to the grid of tube 1300 through a coupling condenser 1296. A resistor 1307 is coupled between the cathode of tube 1300 and the anode of tube 1350.

A cathode follower stage is utilized to connect the signal output of tube 1358 to the succeeding stages. This stage includes the tube 1374, and that tube is preferably a 6AK6. The anode of tube 1358 is coupled to the first grid of tube 1374 through a coupling condenser 1370. This grid is connected to the junction of series-connected cathode resistors 1380 and 1382 through a resistor 1372. The second grid of tube 1374 is connected to the anode of the tube, and the third grid of the tube is connected to the cathode of the tube. An anode resistor 1376 is provided for the tube, and a by-pass condenser 1378 is connected between its anode and ground.

The signal output from tube 1374 is derived across resistors 1380 and 1382 and is applied through coupling condensers 1412 and 1414 to a rectifier circuit including rectifiers 1416 and 1418 having a load resistor 1420 shunted by a condenser 1422.

A thyratron 1398 is provided as a control element for the circuit of FIG. 5A. The voltage output appearing across resistor 1420 is applied to the input circuit of control element 1398 through a resistor 1394 connected to the grid of the tube and the adjustable tap of resistor 1424 connected to the cathode of the tube. The other end of resistor 1424 is connected to a negative source of supply voltage at terminal 1348 through a resistor 1428. A by-pass condenser 1426 is provided for resistor 1424, and the second grid of control element 1398 is grounded.

When the control element 1398 fires, the relay coil 428 of FIG. 1, 2 or 3 connected between terminals 1400 and 1402 will be energized. A condenser 1404 is connected between terminals 1400 and 1402, while a source of A.C. operating voltage for control element 1398 is connected to terminal 1406. A source of a D.C. operating voltage is connected to terminal 1408, while a resistor 1290 is connected as illustrated between resistors 1280 and 1302. Terminal 1410 of the circuit of FIG. 5A is connected to lower input terminal 1200 and is, therefore, grounded.

The circuit of FIG. 5A includes an over level cutoff device; and that device becomes operative in case an unduly large signal is generated in the magnetic head. Such a signal would be generated by the movement of a spurious bill, engraved with ink having unduly large magnetic properties, past the magnetic head. This over level device includes a threshold-type control element 1330; and that control element is shown as a thyratron. An adjustable bias is provided for that control element through series-connected resistors 1342 and 1344 connected between terminal 1348 and ground. A condenser 1340 is connected in parallel with the upper section of resistor 1342 by an adjustable tap on that resistor. That adjustable tap is connected to the grid of tube 1330 through a resistor 1336. The signal input for control element 1330 is derived from the anode load resistor 1228 via the coupling capacitor 1230. The anode of control element 1330 is connected to the anode of the tube 1260.

In order to provide a visual indication of the signal applied to the grid of control element 1398, an indicator tube 1384, commonly called a "Magic Eye," is provided. This tube may be a 6E5; and its cathode is grounded and its control grid is connected to load resistor 1420 through a resistor 1392. A resistor 1390 is connected between the control grid of tube 1384 and ground. The other grid of tube 1384 is connected internally to the anode of that tube, and that anode is connected to junction 1288, as illustrated, through a resistor 1386. The target anode of tube 1384 is directly connected to the junction 1288.

In the operation of the circuit of FIG. 5A, signals derived from the magnetic head and applied to terminals 1200 are amplified in the pre-amplifier which includes tubes 1212, 1226 and 1238. The signal output derived from tube 1238 of the pre-amplifier is applied to the clipper which includes tubes 1260 and 1278. Positive signals applied to the input circuit of tube 1260 cause that tube to become more conductive, and negative signals cause it to become less conductive. The circuit is such that, when tube 1260 is cut off, the tube 1278 becomes conductive, and vice versa. This causes an output signal to appear at the anode of tube 1278 which is limited as to its maximum amplitude in a manner which is well understood by those skilled in the art.

A portion of the signal output of tube 1278 is selected by adjustment of the tap on resistor 1285 and applied to the electronic resonant circuit. The frequency selective amplifier of that resonant circuit is so adjusted, by the taps on resistors 1324 and 1328 which are ganged together, as to provide a ninety degree phase shift in each network for signals of the desired frequency. Because of this phase shift of desired signals and because of the non-selective feedback provided by tube 1350, all signals are attenuated in the amplifier comprising tubes 1300, 1312, 1358 and 1350 except the signals of the desired frequency; and the latter signals are amplified. Those signals produce a controlled cumulative growth in the voltage across the cathode resistors 1380 and 1382. Consequently, the voltage which is applied to the rectifiers 1416 and 1418 by the cathode-coupled device 1374 is the result of the introduction into the electronic resonant circuit of amplified but limited signals of the desired frequency.

The thyratron 1398 is biased by adjustment of the tap on resistor 1424 so that only signals which provide a predetermined growth in voltage across the resistors 1380 and 1382 will effect the firing of that control element. When that control element does fire, the relay connected to terminals 1400 and 1402 is, of course, operated to cause acceptance of the inserted bill. The indicator tube 1384 will be energized simultaneously with the control element 1398, and it will provide a visual indication of the acceptance of the inserted bill.

When the amplitude of the signal applied to the terminals 1200 is too large, thus indicating that a spurious bill is being scanned, a signal will be present at the grid of control element 1330 of sufficient magnitude to fire that control element. This firing has the effect of shorting out the tube 1260; thus making sure that such signals are not effective to fire the control element 1398. When fired, the control element 1330 remains conductive until its D.C. anode voltage is removed. This is done by switch 1254; and it is a simple matter to press the switch 1254 and thereby re-set the circuit of FIG. 5A after an excessively large signal has triggered the control element 1330. A neon lamp 1266 can be provided; and that lamp and a resistor 1264 are connected in parallel with anode resistor 1256. As a result, whenever control element 1330 fires and develops a sizeable voltage drop across resistor 1256, the lamp 1266 will become illuminated to indicate that the control element 1330 has fired. A by-pass capacitor 1268 is connected between ground and the junction of lamp 1266 and resistor 1264.

For the sake of completeness, a power supply circuit which may be used with the circuit of FIG. 5A as illustrated in FIG. 5B. This circuit comprises a transformer having a primary winding 1100 connected to a source of A.C. supply at terminals 1099, and having a secondary winding 1102. Series-connected capacitors 1106 and 1108 are connected across the winding 1100. An indicator lamp 1104 is also connected across as the winding 1100.

A rectifier 1176, for deriving a positive voltage between terminals 1168 and 1188, is provided. Resistors 1174, 1178 and 1184 and capacitors 1180 and 1181, all connected as shown, are provided. A voltage regulator tube 1186 is provided across terminals 1168 and 1188.

Similarly a rectifier 1150 and resistors 1148, 1152 and 1160, as well as condensers 1154 and 1155, all connected as shown, are provided for supplying a negative operating voltage across terminals 1168 and 1166. A voltage regulator tube 1162 is provided across terminals 1166 and 1168.

It will at once be apparent that terminal 1168 of FIG. 5B should be connected to terminal 1410 of FIG. 5A. Similarly, terminal 1166 should be connected to terminal 1348, and terminal 1188 should be connected to terminal 1408 of FIG. 5A. In order to supply the A.C. operating voltage at terminal 1406 of FIG. 5A, terminal 1406 is connected to the terminal designated as 1172 in FIG. 5B. FIG. 6 shows four dashed lines that extend between the power supply 1098 and the tuned amplifier and control element 1190; and those four lines represent the requisite connections described above.

A filament transformer having a primary winding 1116 connected to terminals 1099 and having a secondary winding 1118 is provided. The cathode heaters of the tubes and control elements of FIG. 5A are connected across the winding 1118; and those cathode heaters are related to those tubes and control elements as follows. Heaters 1120 are the center-tapped filament of the duotriode consisting of tubes 1212 and 1226, heaters 1122 are the center-tapped filament of a duotroide consisting of tube 1238 and an unused tube, not shown, heaters 1128 and 1130 are in control elements 1330 and 1398 respectively, and heaters 1132 and 1134 are in tubes 1374 and 1384, respectively. The heaters 1138 are the center-tapped filament of the duotriode consisting of tubes 1260 and 1278, heaters 1140 are the center-tapped filament of the duotriode consisting of tubes 1300 and 1312, and heaters 1142 are the center-tapped filament of the duotriode consisting of tubes 1350 and 1358. A ballast resistor 1136 is connected between the heaters 1138, 1140 and 1142 and the rest of the heaters.

Where an authentic one dollar bill of the United States of America is passing the sensing head 318, 344 or 726, the tuned amplifier of FIG. 5A will cause its electronic resonant circuit to provide two controlled cumulative growths of voltage across resistors 1380 and 1382; and those growths of voltage will be sufficient to fire the control element 1398 twice. The capacitor 1404 across the output terminals 1400 and 1402 will keep the relay coil 428 of FIG. 1, 2 or 3 energized during the non-conducting half cycles of the A.C. voltage supplied to the anode of control element 1398. The resulting two validating signals will enable the relay chain to provide the required accept signal. Unacceptable bills will either be unable to cause the sensing head to provide any voltage variations at all or will provide voltage variations that are either too weak or too strong or that have a frequency and phase other than the repetition rate and phase of the vertical grids of authentic one dollar bills of the United States of America. Hence, unacceptable bills will not fire the control element 1398.

*Amplifier circuit and control elements of FIG. 8*

FIG. 8 illustrates a circuit which is similar in some respects to the circuit of FIG. 4. Specifically, the operation of the circuit of FIG. 8 depends upon the limiting of an input signal, the translating of the limited signal in a resonant circuit, and the utilizing of the resultant output to operate a trigger device. In the circuit of FIG. 8, however, two resonant circuits are provided; each circuit being responsive to a slightly different frequency. One of those resonant circuits could be set to experience a controlled cumulative growth in voltage when an authentic one dollar bill of the United States of America is inserted, while the other of those resonant circuits could be set to experience a controlled cumulative growth in voltage when an authentic five dollar bill of the United States of America is inserted. The circuit of FIG. 8 is, therefore, suitable for identifying and accepting authentic one dollar and five dollar bills of the United States of America.

FIG. 8 illustrates two signal sources 1580 and 1582 which are capable of generating signals having different frequencies. Thus, the signal sources 1580 and 1582 could be magnetic heads that would generate voltage variations having a predetermined repetition rate when an authentic one dollar bill was inserted and that would generate voltage variations having a different, predetermined repetition rate when an authentic five dollar bill was inserted; or, if desired, the signal source 1580 could be an oscillator generating a signal of one frequency and the signal source 1582 could be a second oscillator generating a signal of another frequency. The signals from the signal sources 1580 and 1582 are amplified and translated by the unit 1586.

The signal output from unit 1586 is applied to an amplifier-limiter which includes a vacuum tube 1590; and that output signal is coupled to the grid of tube 1590 by a coupling condenser 1588. The cathode of the tube 1590 is grounded, and its grid is connected to ground through a resistor 1592. The anode of that tube is connected to a suitable source of D.C. operating potential at terminal 1596 through a load resistor 1594. The parameters of the amplifier-limiter are so chosen that tube 1590 operates with anode current saturation for signal input voltages of a predetermined amplitude and thereby provides a limited output signal.

The limited signal output from the tube 1590 is fed to each of two separate signal translating channels. Each of these channels includes another limiter-amplifier similar to the one just described. Thus, the channel at the top of FIG. 8 includes tube 1602 having its grid coupled to the anode of tube 1590 through a coupling condenser 1600 and having its grid connected to ground through a grid resistor 1604. A load resistor 1606 is provided for the tube 1602. The channel at the bottom of FIG. 8 includes tube 1610, coupling condenser 1608, grid resistor 1612, and anode resistor 1614.

The signal output from tube 1602 is applied to a resonant circuit 1616, 1618, 1620, and the output from this resonant circuit is coupled to the grid of a control element 1630. That control element is shown as a thyratron, but mechanical and other electronic threshold-type control elements of the avalanche type could be used. The cathode of control element 1630 is grounded, and a suitable bias for that control element is provided from a suitable source of negative voltage at terminal 1636. This bias voltage is provided for control element 1630 through the tap of a resistor 1634, a resistor 1626 and a resistor 1628. Resistor 1628 is connected in series with a resistor 1624 and a condenser 1622 between the grid of control element 1630 and the resonant circuit. The signal output from the tube 1610 is applied to a resonant circuit 1638, 1640, 1642, and the output from this resonant circuit is coupled to the grid of a control element 1652. The cathode of control element 1652 is grounded, and a suitable bias for that control element is provided from the source of negative voltage at terminal 1636. That bias voltage is provided for control element 1652 through the tap of a resistor 1654, a resistor 1648 and a resistor 1650. Resistor 1650 is connected in series with a resistor 1646 and condenser 1644 between the grid of control element 1652 and the resonant circuit 1638, 1640, 1642.

A suitable source of operating voltage is provided for the control elements 1630 and 1652 at terminals 1632 and 1656, respectively. A series-connected resistor and condenser comparable to resistor 1070 and condenser 1066 of FIG. 4 could be connected between an A.C. voltage source and the terminal 1632; and a similar series-connected resistor and condenser could be connected between that A.C. voltage source and the terminal 1656. Relay coils such as the relay coil 428 of FIG. 1, 2 or 3 could be connected in parallel with those condensers; and, consequently, each of the control elements, upon firing, could be effective to operate a control relay or signal device of some type.

Both the signal from the signal source 1580 and the signal from the signal source 1582 are coupled into each of the resonant circuits; but those signals will not be introduced into that circuit at the same time. If the repetition rate and phase of the quantums of energy in one of those signals coincide with those of the characteristic waveform of one of those resonant circuits, and if the duration and magnitude of each of those quantums of energy in that signal are such that those quantums of energy slightly exceed the losses of that one resonant circuit at some predetermined current value of that one circuit, the voltage in that one circuit will experience a controlled cumulative growth. When the voltage across the inductor of that one circuit reaches a predetermined value, the control element coupled to that one circuit will fire and will provide a validating signal.

The other of the two resonants circuits may be caused to start oscillating by the said one signal, but the repetition rate and phase of the quantums of energy of that signal will not coincide with those of the characteristic waveform of that other circuit; and consequently the voltage in that other resonant circuit will not experience the growth that is needed to trip the control element coupled to that other resonant circuit. The required controlled cumulative growth of voltage will occur in that other circuit only when a signal, wherein the quantums of energy have a repetition rate and phase that substantially coincide with those of the characteristic waveform of that circuit, is coupled into that circuit. This means that although signals having two separate frequencies are introduced into each of the resonant circuits, one of those circuits will respond to signals having one frequency to actuate its control element but will not respond to signals having the other frequency to actuate that control element; whereas the other circuit will respond to the other frequency to actuate its control element but will not respond to the said one frequency to actuate that control element.

Where the signal sources 1580 and 1582 are sensing heads in a currency detector, the terminal 1632 can be connected to a relay chain or the like that will supply a suitable accept signal to the currency detector and that will also accredit the patron with the insertion of an authentic one dollar bill of the United States of America; and the terminal 1656 can be connected to a relay chain or the like that will supply a suitable accept signal to the currency detector and that will also accredit the patron with the insertion of an authentic five dollar bill of the United States of America. Further, the resonant circuit 1616, 1618, 1620 can be set to resonate at approximately nineteen hundred and thirty three cycles per second, while the resonant circuit 1638, 1640, 1642 can be set to resonate at approximately thirteen hundred and forty two cycles per second. Where this is done, the vertical grid lines of an authentic one dollar bill of the United States of America will cause the signal sources 1580 and 1582 to supply voltage variations to the amplifier 1586, and the resulting amplified nineteen hundred and thirty three cycles per second signal will be applied to both resonant circuits; but only the resonant circuit 1616, 1618, 1620 will experience the controlled cumulative growth of voltage that is needed. Consequently, that resonant circuit will fire the control element 1630 whereas the resonant circuit 1638, 1640, 1642 will be unable to fire the control element 1652. However, the vertical grid lines of an authentic five dollar bill of the United States of America will cause the signal sources 1580 and 1582 to supply voltage variations to the amplifier 1586, and the resulting amplified thirteen hundred and forty two cycles per second signal will cause the resonant circuit 1638, 1640, 1642 to experience the controlled cumulative growth needed to fire the control element 1652 but will be unable to cause the resonant circuit 1616, 1618, 1620 to fire the control element 1630. In this way, the circuit of FIG. 8 enables the currency detector of the present invention to reject spurious paper currency and to provide one response when an authentic one dollar bill of the United States of America is inserted while providing a distinctively different response when an authentic five dollar bill of the United States of America is inserted.

The controlled cumulative growth of voltage that is experienced in the circuits of FIGS. 4, 5A and 8 is very important, because it keeps those circuits from responding to noise pulses or transients which could simulate one, two, three, four or five of the voltage variations generated by authentic bills. Because of the low signal-to-noise ratio imposed by the limited magnetic properties in the ink used in engraving authentic paper currency of the United States of America, noise pulses and transients frequently are able to simulate the voltage variations generated by authentic bills; and if the circuits of FIGS. 4, 5A or 8 merely counted a minimum number of voltage variations or merely responded to voltage variations having a predetermined repetition rate, noise pulses and transients could cause the acceptance of spurious bills. However, by relying upon controlled cumulative growth of voltage based upon six or more voltage variations, the circuits of FIGS. 4, 5A and 8 keep noise pulses and transients from causing the acceptance of spurious bills.

The circuit of FIG. 8 can be set to distinguish between signals having frequencies that are much closer together than are the signals obtainable from authentic one dollar bills and five dollar bills of the United States of America. Specifically, that circuit can be set to distinguish between frequencies that are closer together than thirty cycles per second. As indicated by FIG. 9, a frequency response curve 1660 peaks at a frequency of one thousand and twenty six cycles per second and a second frequency response curve 1664 peaks at one thousand and fifty two and seven tenths cycles per second. The curve 1660 can, and will be considered to, be the frequency response curve of the resonant circuit 1616, 1618, 1620; and the curve 1664 can, and will be considered to, be the frequency response curve of the resonant circuit 1638, 1640, 1642. The line 1662 in FIG. 9 indicates the threshold value of the control element 1630; and the curve 1660 will have to exceed that threshold value before the control element 1630 can fire. Similarly, the line 1666 in FIG. 9 indicates the threshold value of the control element 1652; and the curve 1664 will have to exceed that threshold value before the control element 1652 can fire. The slopes of the curves 1660 and 1664 are, at the threshold values 1662 and 1666, spaced apart approximately ten cycles, thereby providing a guard channel having a width approximately equal to one percent of the peak frequency of the curve 1660. Such a narrow guard channel is adequate to prevent interference between the operation of the control elements 1630 and 1652 because those control elements coact with the resonant circuits, that trigger them, to provide infinite rejection of all frequencies falling outside of the narrow bands subtended by curve 1660 and line 1662 and by curve 1664 and line 1666, respectively. That infinite rejection is the result of limiting the quantitative values of the quantums of energy introduced into those resonant circuits, of requiring the repetition rate and phase of those quantums of energy to coincide with those of the characteristic waveform of the resonant circuit and of requiring those quantums of energy to have magnitudes and durations that enable each of those quantums of energy to slightly exceed the losses of those resonant circuits, and of requiring the control elements 1630 and 1652 to have high threshold values.

The circuit of FIG. 8 could have additional signal sources, like signal sources 1580 and 1582, connected to the junction 1584; and it could have additional tubes, like tubes 1602 and 1610, coupled to the junction 1598. Those additional tubes would have their outputs coupled to additional resonant circuits that could trigger additional control elements. Those additional control elements, plus the control elements 1030 and 1052, could be used to actuate "read outs" or other controlled elements. The additional resonant circuits would be set to peak at frequencies spaced from the frequencies of one thousand twenty six cycles per second and of one thousand and fifty two and seven tenths cycles per second; and those additional resonant circuits could have frequency response curves that have their slopes, at the threshold values of the control elements therefor, spaced from the slopes of adjacent frequency response curves, at the threshold values of the control elements therefor, by guard channels having widths approximately equal to one percent of the center frequency of the lower frequency curve. Specifically, one additional resonant circuit could be set to peak at one thousand cycles per second; and its slope, at the threshold value of is control element, would be spaced from the left-hand slope of curve 1660, at the line 1662, by approximately ten cycles. Also, another additional resonant circuit could be set to peak at one thousand and eighty cycles per second; and its slope, at the threshold value of its control element, would be spaced from the right-hand slope of curve 1664, at the line 1666, by approximately ten and one half cycles. By setting the threshold values of the various control elements high enough, and by using resonant circuits having Q values in excess of twenty five, it is possible to fit as many as twenty seven discrete and distinguishable pass bands in one octave. Such an arrangement is very desirable for telemetry of the query type. By setting the threshold values of the various control elements a little lower, and by selecting frequencies that are spaced further apart in the spectrum, it is possible to broaden the pass bands and still have them discrete and distinguishable from each other. Such wider, but closely adjacent, pass bands would be very useful in the selective calling of police vehicles, of taxicabs, or the like. Such wider, but closely adjacent, pass bands are also usable in many other fields.

*Alternate constructions*

The resonant circuit will preferably be connected as shown in FIG. 4. However, that circuit could be connected in many other ways. The primary requirement of the connection between the limiter and the resonant circuit is that it couples the signals into that circuit without loading that circuit.

FIG. 10 shows the resonant circuit connected in the plate circuit of the limiter. Thus, a load resistor 1448 is connected to the anode of tube 1446, and the resonant 1452, 1454 is connected to that resistor. The tube 1446 corresponds to the tube 1046 of FIG. 4 and the resonant circuit 1452, 1454 corresponds to the resonant circuit 1050, 1052, 1054. The tube 1446 has signals coupled to its grid by capacitor 1442, and it has a grid-leak resistor 1444. The cathode of tube 1446 is grounded; and the resonant circuit will be connected to a source of D.C. voltage such as the voltage regulator tube 962 of FIG. 4.

When signals, having the repetition rate and phase of those of the characteristic waveform of the resonant circuit 1452, 1454 and having quantums of energy of a magnitude slightly greater than the losses of that resonant circuit, are translated by the tube 1446, the voltage in that resonant circuit experiences a controlled cumulative growth. Where enough of those quantums of energy are introduced into that resonant circuit in a predetermined length of time, the voltage across the inductor 1454 will reach a predetermined value. Thereupon, a condenser 1458 will couple that voltage to the grid of a control element, not shown, that is comparable to the control element 1064; and that voltage will fire that conrol element. The resistors 1456, 1460 and 1462 are comparable to the resistors 1056, 1060 and 1062 of FIG. 4.

The resistor 1448 will be quite large and will keep the tube 1446 from appreciably loading the resonant circuit 1452, 1454. The resistor 1456 will keep the control element, not shown, from appreciably loading that resonant circuit. As a result, that resonant circuit can have a high Q. If desired, the resonant circuit 1452, 1454 could be located in the cathode circuit of the tube 1446. In such a case, the resistor 1448 would be interposed between the cathode of tube 1446 and the resonant circuit 1452, 1454 to minimize the loading of that resonant circuit by the tube 1446.

FIG. 11 shows an arrangement wherein the signals from the limiter are inductively coupled to the resonant circuit. Thus, an adjustable core transformer having a primary winding 1551 and a secondary winding 1554 couples signals from the plate circuit of tube 1546 into resonant circuit 1552, 1554. The tube 1546 is comparable to the tube 1046, and it has input signals coupled to its grid by a capacitor 1542. A resistor 1544 connects the grid of tube 1546 to a source of negative voltage, such as the junction of resistors 990 and 992 in FIG. 4, thereby providing the bias required for the tube 1546.

The upper end of the primary winding 1551 is connected to a source of D.C. voltage such as the voltage regulator tube 962 of FIG. 4. The lower end of the secondary winding 1554 is connected to a source of negative voltage such as the tap of resistor 992 in FIG. 4. The upper end of the secondary winding 1554 is connected to the grid of a control element, not shown, such as the control element 1064 of FIG. 4 by a resistor 1562.

The transformer of FIG. 11 will couple the signals translated by the tube 1546 into the resonant circuit 1552, 1554. When those signals have a repetition rate and phase that substantially coincide with those of the characteristic waveform of resonant circuit 1552, 1554 and have quantums of energy of a magnitude slightly greater than the losses of that resonant circuit, those signals will cause that resonant circuit to experience a controlled cumulative growth. When the voltage across the secondary winding 1554 reaches a predetermined value, the control element connected to the resistor 1562 will be tripped. If desired, the transformer of FIG. 11 could be located in the cathode circuit of tube 1546. In either event, the secondary winding of that transformer performs the dual function of coupling signals into the resonant circuit and of constituting part of the impedance of that resonant circuit.

In FIGS. 1, 2 and 3, relay chains have been shown and described which respond to the control elements. Such relay chains are preferred, but it is possible to use a stepping relay in place of any of those relay chains.

*Summation*

The voltage variations generated when the vertical grid lines are moved relative to the air gap are amplified; and the resulting signals are then analyzed to determine whether the bill will be accepted or rejected. If the magnetic properties of the ink in those vertical grid lines are too weak, the bill will be rejected. If the magnetic properties of the ink in those vertical grid lines are too strong, the bill will be rejected; and if the spacing between, and the widths of, those grid lines are not correct, the bill will be rejected. The portion of the portrait background intermediate the leading edge of that background and the leading edge of the portrait provides the six or more voltage variations that lead to a first validating signal, and the portion of the portrait background intermediate the trailing edge of the portrait and the trailing edge of the portrait background provides the six or more voltage variations that lead to the second validating signal; and this is desirable because it prevents the acceptance of a bill that is split along its vertically-directed center line. After the bill has been sensed, it will be directed to a cash box.

Whereas the drawing and accompanying description have shown and described several embodiments of the present invention, it should be apparent to those skilled in the art that various changes may be made in the form of the invention without affecting the scope thereof.

What we claim is:

1. A system comprising,
a sensing element responsive to relative motion with respect to coded matter to generate alternating current signals of a predetermined frequency,
amplifier means connected to said sensing element for amplifying said signals to provide amplified signals,
limiter means connected in cascade to said amplifier means for limiting the level of the amplified signals to a predetermined value,
a resonant circuit responsive to said limiter means,
said resonant circuit being tuned to said frequency and having a sufficiently high Q that a predetermined number of successive cycles of said signal is required to attain a predetermined level of response of said resonant circuit,
said response increasing progressively in response to successive cycles of said signal,
a threshold device responsive to said response of said resonant circuit only after said response has attained said predetermined level to provide an accept signal,
said resonant circuit including an inductance and plural series capacitors connected in parallel with said inductance,
and
a driving coupling between said limiting means and a junction of said plural capacitors.

2. The combination according to claim 1 wherein said sensing element is magnetic and said coded matter is magnetic.

3. The combination according to claim 2 wherein said threshold device includes bias responsive means for adjusting said predetermined level, and
means responsive to a predetermined amplitude of said alternating current signals of a predetermined frequency for adjusting said bias to raise said predetermined level.

4. The combination according to claim 3 wherein said threshold device is an electronic switch and wherein said bias responsive means is a control electrode.

5. The combination according to claim 4 wherein said electronic switch is a gaseous conduction device and said bias responsive means is a control electrode.

References Cited by the Examiner

UNITED STATES PATENTS

| | | | |
|---|---|---|---|
| 2,346,804 | 4/1944 | White | 340—171 |
| 2,567,667 | 9/1951 | Hanchett | 328—1 |
| 2,596,591 | 5/1952 | Packard et al. | 328—2 |
| 2,694,162 | 11/1954 | English | 328—2 |
| 2,749,537 | 6/1956 | Loudon et al. | 340—171 |
| 2,780,724 | 2/1957 | Fickett | 328—138 |
| 2,853,604 | 9/1958 | Campbell | 328—138 |
| 2,894,150 | 7/1959 | Bopp | 307—88.5 |
| 2,964,684 | 12/1960 | Busse | 317—123 |
| 2,994,015 | 7/1961 | Eidam | 328—5 |
| 2,994,032 | 7/1961 | Hansen | 324—38 |
| 3,034,060 | 5/1962 | Davidson | 307—88.5 |
| 3,049,648 | 8/1962 | Nelson | 317—123 |
| 3,072,801 | 1/1963 | Dahlberg | 307—88.5 |
| 3,103,558 | 9/1963 | Ligotsky | 340—171 |

JOHN W. HUCKERT, *Primary Examiner.*

ARTHUR GAUSS, LOUIS J. DEMBO, *Examiners.*

J. D. CRAIG, R. B. REEVES, *Assistant Examiners.*